United States Patent
Temple et al.

(10) Patent No.: US 10,898,852 B2
(45) Date of Patent: Jan. 26, 2021

(54) PROCESSES FOR REMOVING A NITROGEN-BASED COMPOUND FROM A GAS OR LIQUID STREAM TO PRODUCE A NITROGEN-BASED PRODUCT

(71) Applicants: Stephen R. Temple, Santa Cruz, CA (US); Bjorn Temple, Santa Cruz, CA (US)

(72) Inventors: Stephen R. Temple, Santa Cruz, CA (US); Bjorn Temple, Santa Cruz, CA (US)

(*) Notice: Subject to any disclaimer, the term of this patent is extended or adjusted under 35 U.S.C. 154(b) by 0 days.

(21) Appl. No.: 15/678,011

(22) Filed: Aug. 15, 2017

(65) Prior Publication Data
US 2018/0043296 A1 Feb. 15, 2018

Related U.S. Application Data

(60) Provisional application No. 62/452,294, filed on Jan. 30, 2017, provisional application No. 62/375,400, filed on Aug. 15, 2016.

(51) Int. Cl.
| *B01D 53/14* | (2006.01) |
| *C05B 7/00* | (2006.01) |
| *B01D 53/58* | (2006.01) |
| *B01D 1/00* | (2006.01) |
| *B01D 19/00* | (2006.01) |
| *C05C 11/00* | (2006.01) |

(52) U.S. Cl.
CPC .......... *B01D 53/1493* (2013.01); *B01D 1/00* (2013.01); *B01D 19/0031* (2013.01); *B01D 53/1487* (2013.01); *B01D 53/58* (2013.01); *C05B 7/00* (2013.01); *C05C 11/00* (2013.01); *B01D 2251/70* (2013.01); *B01D 2252/20* (2013.01); *B01D 2258/0266* (2013.01); *Y02E 50/30* (2013.01)

(58) Field of Classification Search
CPC .. B01D 53/1493; B01D 1/00; B01D 53/1487; B01D 19/0031; B01D 2252/20; B01D 2251/70; B01D 2258/0266; B01D 53/58; B01D 2258/0275; B01D 53/229; B01D 53/73; C05C 11/00; C05B 7/00; H04B 10/116; H04J 2011/0013; H04L 1/0003; H04L 5/143; H04Q 11/0062; H04Q 2011/0064; G01R 1/0408; G01R 1/0433; G01R 1/0483; G01R 1/06716; G01R 1/06738; G01R 1/0735; G01R 31/2601; Y02E 50/343; Y02E 50/30; H04W 74/06
See application file for complete search history.

(56) References Cited

U.S. PATENT DOCUMENTS

| 1,932,755 | A | * | 10/1933 | Stiles | ........................ C12P 7/52 |
| | | | | | 435/140 |
| 1,969,021 | A | | 8/1934 | Nils | |
| 2,362,906 | A | * | 11/1944 | Leo | ........................ C07C 51/412 |
| | | | | | 562/584 |
| 3,021,189 | A | | 2/1962 | Mancke et al. | |
| 3,342,545 | A | | 9/1967 | Jaeger | |
| 3,572,010 | A | | 3/1971 | Dupps | |
| 3,676,318 | A | | 7/1972 | Lauer | |
| 3,717,701 | A | | 2/1973 | Carlson | |
| 3,729,298 | A | | 4/1973 | Anderson | |
| 3,883,329 | A | | 5/1975 | Dupps, Sr. | |
| 3,905,774 | A | | 9/1975 | Kotting | |
| 3,949,055 | A | | 4/1976 | Schneider et al. | |
| 3,949,056 | A | | 4/1976 | Nakshbendi | |
| 3,985,523 | A | | 10/1976 | Kaupas et al. | |
| 4,002,722 | A | | 1/1977 | Suzuki et al. | |
| 4,003,798 | A | | 1/1977 | McCord | |
| 4,092,446 | A | | 5/1978 | Padovani | |
| 4,172,880 | A | | 10/1979 | Tzavos | |
| 4,203,765 | A | | 5/1980 | Claeys et al. | |
| 4,265,088 | A | | 5/1981 | Funk | |
| 4,283,211 | A | | 8/1981 | Ehrlich | |
| 4,307,067 | A | | 12/1981 | Tagawa et al. | |

(Continued)

FOREIGN PATENT DOCUMENTS

| DE | 37 12 209 | 10/1988 |
| DE | 197 53 117 | 1/1999 |

(Continued)

OTHER PUBLICATIONS

RealClimate (2 pages, published 2004) (Year: 2004).*

(Continued)

*Primary Examiner* — Yevgeny Valenrod
*Assistant Examiner* — Blaine G Doletski
(74) *Attorney, Agent, or Firm* — Owens Law Firm, PC

(57) ABSTRACT

The present invention is directed to a process for removing gas phase nitrogen-based compounds by absorption into a liquid stream. The absorbed nitrogen-based compound is reacted with an acid to produce a nitrogen-based product. The nitrogen-based compound, the acid, and the resulting nitrogen-based product may be organic compounds, i.e. compounds derived from animal matter or plant matter. The nitrogen-based product may be a fertilizer, such as ammonium acetate or ammonium citrate that may be certified as organic. Processes are also described for removing nitrogen-based compounds from a liquid stream to produce a nitrogen-based product, including organic fertilizers. One process includes producing cavitation bubbles into which a liquid phase nitrogen-based compound is stripped, followed by absorption to produce a nitrogen-based product. Another process includes the use of a degassing membrane to remove a liquid phase nitrogen-based compound that is degassed to produce a nitrogen-based product, including organic fertilizers.

23 Claims, 7 Drawing Sheets

(56) References Cited

U.S. PATENT DOCUMENTS

| | | | |
|---|---|---|---|
| 4,363,215 A | 12/1982 | Sharp | |
| 4,443,342 A | 4/1984 | Stas et al. | |
| 4,451,277 A | 5/1984 | Barber | |
| 4,451,442 A | 5/1984 | Jeffrey et al. | |
| 4,460,552 A | 7/1984 | Zakrzewski | |
| 4,595,577 A | 6/1986 | Stas | |
| 4,614,646 A | 9/1986 | Christiansen | |
| 4,662,899 A | 5/1987 | Tandon | |
| 4,964,885 A | 10/1990 | Wieser-Linhart | |
| 5,019,339 A | 5/1991 | Keeney et al. | |
| 5,279,646 A | 1/1994 | Schwab | |
| 5,308,589 A | 5/1994 | Yung | |
| 5,567,402 A | 10/1996 | Vicard et al. | |
| 5,597,539 A | 1/1997 | Fakley et al. | |
| 5,945,078 A | 8/1999 | Taylor et al. | |
| 5,972,401 A | 10/1999 | Kowalski | |
| 6,015,536 A | 1/2000 | Lokkesmoe et al. | |
| 6,160,194 A | 12/2000 | Pignatello | |
| 6,183,708 B1 | 2/2001 | Hei et al. | |
| 6,190,629 B1* | 2/2001 | Solomon | B01D 53/14 422/168 |
| 6,375,721 B1 | 4/2002 | Holter | |
| 6,459,011 B1 | 10/2002 | Tarr et al. | |
| 6,464,875 B1* | 10/2002 | Woodruff | C02F 1/586 210/252 |
| 6,645,450 B2 | 11/2003 | Stoltz et al. | |
| 6,821,382 B1 | 11/2004 | Lundgren | |
| 6,843,835 B2 | 1/2005 | Fornai | |
| 6,926,878 B2 | 8/2005 | Santina | |
| 6,960,330 B1 | 11/2005 | Cox | |
| 7,112,309 B2 | 9/2006 | Stoltz et al. | |
| 7,264,694 B2 | 9/2007 | Merrell | |
| 7,550,123 B2 | 6/2009 | Temple et al. | |
| 7,582,271 B2 | 9/2009 | Parrish et al. | |
| 8,025,860 B1 | 9/2011 | Diamond | |
| 8,100,990 B2 | 1/2012 | Ellens | |
| 8,137,444 B2 | 3/2012 | Farsad | |
| 8,282,901 B2 | 10/2012 | Petrocelli | |
| 8,753,566 B1 | 6/2014 | Temple | |
| 8,795,475 B2 | 8/2014 | Hutchins | |
| 2002/0034468 A1 | 3/2002 | Spink et al. | |
| 2003/0057160 A1 | 3/2003 | Williams et al. | |
| 2006/0006055 A1 | 1/2006 | Bonde | |
| 2008/0053909 A1* | 3/2008 | Fassbender | B01J 39/04 210/664 |
| 2008/0152567 A1 | 6/2008 | Killough | |
| 2008/0221314 A1 | 9/2008 | Freire | |
| 2009/0078013 A1 | 3/2009 | Spindler et al. | |
| 2010/0021979 A1 | 1/2010 | Facey | |
| 2010/0280135 A1 | 11/2010 | Doty | |
| 2011/0061528 A1 | 3/2011 | Taylor | |
| 2011/0189049 A1 | 8/2011 | Beaulieu et al. | |
| 2011/0258914 A1 | 10/2011 | Banasiak | |
| 2011/0280762 A1 | 11/2011 | Mattelmaki et al. | |
| 2012/0076716 A1 | 3/2012 | Suchak et al. | |
| 2012/0288570 A1 | 11/2012 | Zhu | |
| 2012/0304540 A1 | 12/2012 | Hulteberg | |
| 2013/0028827 A1 | 1/2013 | Hickey | |
| 2014/0003995 A1 | 1/2014 | Temple | |
| 2014/0033776 A1* | 2/2014 | Josse | C02F 1/20 71/10 |
| 2014/0202206 A1 | 7/2014 | Temple | |
| 2014/0263100 A1 | 9/2014 | Kumar | |
| 2014/0363344 A1* | 12/2014 | Orentlicher | C01C 1/242 422/148 |
| 2015/0132210 A1 | 5/2015 | Szogi | |
| 2015/0196874 A1 | 7/2015 | Temple | |
| 2015/0274541 A1 | 10/2015 | Jeppson et al. | |
| 2015/0329399 A1 | 11/2015 | Kumar | |
| 2016/0129392 A1 | 5/2016 | Temple | |
| 2016/0200613 A1 | 7/2016 | orentlicher | |
| 2017/0136386 A1 | 5/2017 | Temple | |

FOREIGN PATENT DOCUMENTS

| | | |
|---|---|---|
| DE | 198 24 903 | 2/2000 |
| EP | 14 74 3226 | 9/2016 |
| JP | 01-317528 | 12/1989 |
| JP | 09-04431 | 4/1997 |
| JP | 5467765 B2 | 4/2014 |
| KR | 10-1187291 | 10/2012 |
| WO | WO81/03034 | 10/1981 |
| WO | WO2007047350 | * 4/2007 |

OTHER PUBLICATIONS

Beta Analytic (2 pages, published 2009) (Year: 2009).*
Oxford Dictionaries (2 pages, published 2010) (Year: 2010).*
English Oxford Dictionaries (published 2010, 2 pages) (Year: 2010).*
EveryCRSReport (Year: 2004).*
Roy (Roy H. Amit Riegel's Handbook of Industrial Chemistry, 10th Edition, Chapter 11, Fertilizers, pp. 386-428, Published 2003) (Year: 2003).*
USDA (Year: 2020).*
Stratton (How to Start an Organic Farm, pp. 1-3, Published 2013) (Year: 2013).*
Zahn et al., "Effect of a Packed-Bed Scrubber Using Radox Catalyst on the Emission of Odors and Volatile Organic Compounds from a Commercial Poultry Rendering Plant," Apr. 2002.
Sun et al., "Chemical Treatment of Pesticide Wastes—Evaluation of Fe(III) Chelates for Catalytic Hydrogen Peroxide Oxidation of 2,4-D at Circumneutral pH," J. Agric. Food Chem. 40:322-327 (1992).
"Fenton's Reagent Iron Catalyzed Hydrogen Peroxide," http://www.h2o2.com/applications/Industrialwastewater/fentonsreagent.html (1996).
Rempp et al., "Polymer Synthesis," 2d rev. ed., Huthig & Wepf Verlag Basel, New York, p. 56 (1991).
"Storage and Handling of Hydrogen Peroxide," Effluent and Water Treatment J. 19:34-37 (1979).
"Analysis of Aqueous Effluents," Effluent and Water Treatment J. 19:29-33 (1979).
"Advantages of Peroxygen Products in Pollution Control;" Effluent and Water Treatment J. 19:4-5 (1979).
"Use of Hydrogen Peroxide in Gas Scrubbing," Effluent and Water Treatment J. 19:20-22 (1979).

* cited by examiner

PROCESSES FOR REMOVING A NITROGEN-BASED COMPOUND FROM A GAS OR LIQUID STREAM TO PRODUCE A NITROGEN-BASED PRODUCT

BACKGROUND OF THE INVENTION

Field of the Invention

The invention and its various embodiments relate to a process for removing nitrogen compounds from a gas stream to produce a nitrogen-based product. In particular, the invention and its various embodiments relate to a process for removing nitrogen compounds, such as ammonia, from a gas stream having an organic origin using an organically-derived acid to produce an organic ammonium-based product, such as an organic or organic certified fertilizer.

Description of Related Art

Organic agriculture is the production of food from plants and animals through the use of natural or organic resources as opposed to synthetic resources, such as synthetic fertilizers. Organic agriculture may also be referred to as organic farming. Generally, organic foods may be labeled as "certified" by meeting certain regulatory criteria for their production, including the avoidance of synthetic chemical inputs, such as the synthetic fertilizers. Although, some organic foods may be labeled as "non-certified."

Organic fertilizers that may be used in the production of organic foods would include fertilizers derived from animal matter, such as animal excreta, and vegetable matter, such as compost and crop residues. Accordingly, solid wastes from animal processing may be used as organic fertilizers.

Animal byproduct processing (e.g., rendering) generally consists of converting waste animal tissue into animal feed such as purified animal fats (e.g., lard, tallow, and grease) and protein meal (e.g., meat, feather meal, hair meal, wool meal, bone meal, and blood meal). Generally, byproduct processing is performed by simultaneously drying the animal byproduct and separating the fat from the bone and protein.

For example, in a rendering process, the raw animal material is brought to the plant in trucks and placed into a raw material conveyor that is fed to a grinder where the raw animal material is ground. The ground material is then cooked in a continuous or batch cooker (e.g., disk dryer, evaporator) to evaporate moisture and to separate fat from bone and protein. The resulting material is then separated into liquid fat and solids. The solids are further processed to remove additional moisture and fats (e.g., by using a screw press) resulting in the generation of a press cake that is ultimately made into a meal product.

However, gas streams are also produced during animal byproduct processing. For example, in a rendering process, gas streams are generated at several points, including the unloading, conveyance, and grinding of raw material; the cooking of the ground material; and at other points in the process. These gas streams may contain various chemical compounds including nitrogen-based compounds, such as ammonia. Typically, these gas streams are collected by a ventilation system and treated by various methods (e.g. spray scrubbing, packed bed wet scrubbing, incineration) to remove various compounds, including certain odorous compounds, before being released to the atmosphere.

In addition, in some cases, these gas streams are treated by condensing the stream to remove certain chemical compounds from the vapor stream. This condensation produces a liquid condensate stream that contains the chemical components that have been removed from the vapor stream. Since there may be multiple gas streams produced in any given animal byproduct process, it should be appreciated that, for example, a rendering facility can generate multiple condensate streams at various points in the process. For example, condensate streams may be produced from condensers used in conjunction with the cooker, an evaporator, a disk dryer, a spray dryer, drum dryer, or any other process step in which a vapor stream is produced and can be condensed. Condensate sources can also include wet scrubber blow down, spray venturi blow down, hair and feather hydrolyser condensate, cooker and evaporator condensate, blood serum, and other process streams containing ammonia, ammonium, and/or total kjeldahl nitrogen (TKN). Typically, these condensate streams are mixed together and may be mixed with other liquid waste streams to form a single liquid waste stream that can be processed using a waste water treatment system prior to discharge.

Moreover, there are many other liquid streams produced by various industrial processes that contain nitrogen compounds, including liquid streams from various animal related industries, generated organically or non-synthetically. In some cases, these liquid streams are simply treated and discharged.

Given that the above mentioned gas streams and liquid streams may be relatively rich in nitrogen compounds, such as ammonia, a need exists for a process to recover these nitrogen compounds and to produce a nitrogen-based product, including a saleable nitrogen-based product. A need exists for a process to recover these nitrogen compounds and to produce a fertilizer product, including one that can be used in organic agriculture or that can be certified as an organic fertilizer, given the organic origins of the nitrogen compounds in the gas streams and the liquid streams. More specifically, a need exists for a process to recover nitrogen-based compounds from any gas stream, in which the nitrogen-based compounds have an organic origin, to produce a fertilizer product, including one that can be used in organic agriculture or that can be certified as an organic fertilizer. Also, a need exists for a process to recover nitrogen-based compounds from any liquid stream, in which the nitrogen-based compounds have an organic origin, to produce a fertilizer product, including one that can be used in organic agriculture or that can be certified as an organic fertilizer. In this latter case, a need also exists for a process to recover the nitrogen components from these liquid streams, including the above mentioned condensate streams, to produce a gas or gas stream from which a saleable product, such as a nitrogen-based product, including a saleable nitrogen-based product.

BRIEF SUMMARY OF THE INVENTION

The present invention is directed to a process for removing gas phase nitrogen-based compounds by absorption into a liquid stream. The absorbed nitrogen-based compound is reacted with an acid to produce a nitrogen-based product. The nitrogen-based compound, the acid, and the resulting nitrogen-based product may be organic compounds, i.e. compounds derived from animal matter or plant matter, as opposed to synthetic or man-made compounds. The nitrogen-based product may be a fertilizer, such as ammonium acetate or ammonium citrate that may be certified as organic.

More specifically, in one embodiment, the present invention is directed to a process for removing nitrogen-based compounds from a gas stream by absorbing at least a portion of one of those compounds into a liquid stream. The absorbed nitrogen-based compound in the liquid stream is then reacted with a liquid phase chemical compound to produce a nitrogen-based product. In particular, the nitrogen-based compound in the gas stream and the liquid phase chemical compound with which the absorbed nitrogen-based compound is reacted may be "organic" compounds, i.e. compounds derived from living organisms, such as from animal matter or plant or vegetable matter, or having animal or plant origins, as opposed synthetic compounds.

Accordingly, in some embodiments, the nitrogen-based product that is produced through the reaction of the absorbed nitrogen-based compound and the liquid phase chemical compound is an organic nitrogen-based product. In some embodiments, the nitrogen-based compound in the gas stream is organic ammonia. In some embodiments, the liquid phase chemical compound with which the absorbed nitrogen-based compound reacts is organic acetic acid or organic citric acid. Accordingly, in some embodiments, the nitrogen-based product may be a fertilizer, in particular, an organic fertilizer, such as organic ammonium acetate or organic ammonium citrate or an organic fertilizer that may be certified as organic.

In some embodiments, the gas stream may be derived from a liquid stream containing a nitrogen-based compound, such as ammonium. In these embodiments, the nitrogen-based compound is stripped from the liquid stream into a gas stream that is then processed as described above by absorbing the nitrogen-based compound into a liquid stream containing a liquid phase chemical compound that reacts with the absorbed nitrogen-based compound to produce a nitrogen-based product. Similarly, in some embodiments, the nitrogen-based product that is produced through the reaction of the absorbed nitrogen-based compound and the liquid phase chemical compound is an organic nitrogen-based product. In some embodiments, the nitrogen-based compound in the gas stream is organic ammonia. In some embodiments, the liquid phase chemical compound with which the absorbed nitrogen-based compound reacts is organic acetic acid or organic citric acid. Accordingly, in some embodiments, the nitrogen-based product may be a fertilizer, in particular, an organic fertilizer, such as organic ammonium acetate or organic ammonium citrate or an organic fertilizer that may be certified as organic.

The present invention is also directed to processes for removing nitrogen-based compounds from a liquid stream to produce a nitrogen-based product, including organic fertilizers. One process includes producing cavitation bubbles into which a liquid phase nitrogen-based compound is stripped, followed by collection of the bubbles containing the stripped nitrogen-based compound into a single gas mass or stream and absorption of the nitrogen-based compound into a liquid stream containing a liquid phase chemical, such as an acid, to produce a nitrogen-based product. In some embodiments, the cavitation bubbles are produced in the liquid stream by any known means in the art, including the application of acoustic, such as ultrasonic energy, or the use of hydrodynamic cavitation. In some embodiments, the nitrogen-based product may be a fertilizer, in particular, an organic fertilizer, such as organic ammonium acetate or organic ammonium citrate or an organic fertilizer that may be certified as organic.

Another process includes the use of a degassing membrane to remove a liquid phase nitrogen-based compound that is degassed to produce a nitrogen-based product, including organic fertilizers. In this case, a liquid stream containing a nitrogen-based compound is treated, for example, by raising the pH to degas the nitrogen-based compound from the liquid phase. The membrane is designed to permit the degassed nitrogen-based compound to pass through the membrane. The gas that has passed through the membrane contacts an acidic solution on the other side of the membrane to absorb the nitrogen-based or nitrogen-rich compounds and produce a saleable nitrogen-based product, such as fertilizer. In some embodiments, the acidic solution may be an acidic solution of acetic acid to produce, for example, ammonium acetate, which can be used as a fertilizer. It sound be appreciated that other absorbing solutions could be used to produce, for example, ammonium sulfate or ammonium nitrate, or similar compounds. In some embodiments, the acidic solution may be an acidic solution of citric acid to produce, for example, ammonium citrate, which can be used as a fertilizer. In some embodiments, the nitrogen-based product may be a fertilizer, in particular, an organic fertilizer, such as organic ammonium acetate or organic ammonium citrate or an organic fertilizer that may be certified as organic.

DETAILED DESCRIPTION OF THE INVENTION

Figure 1:
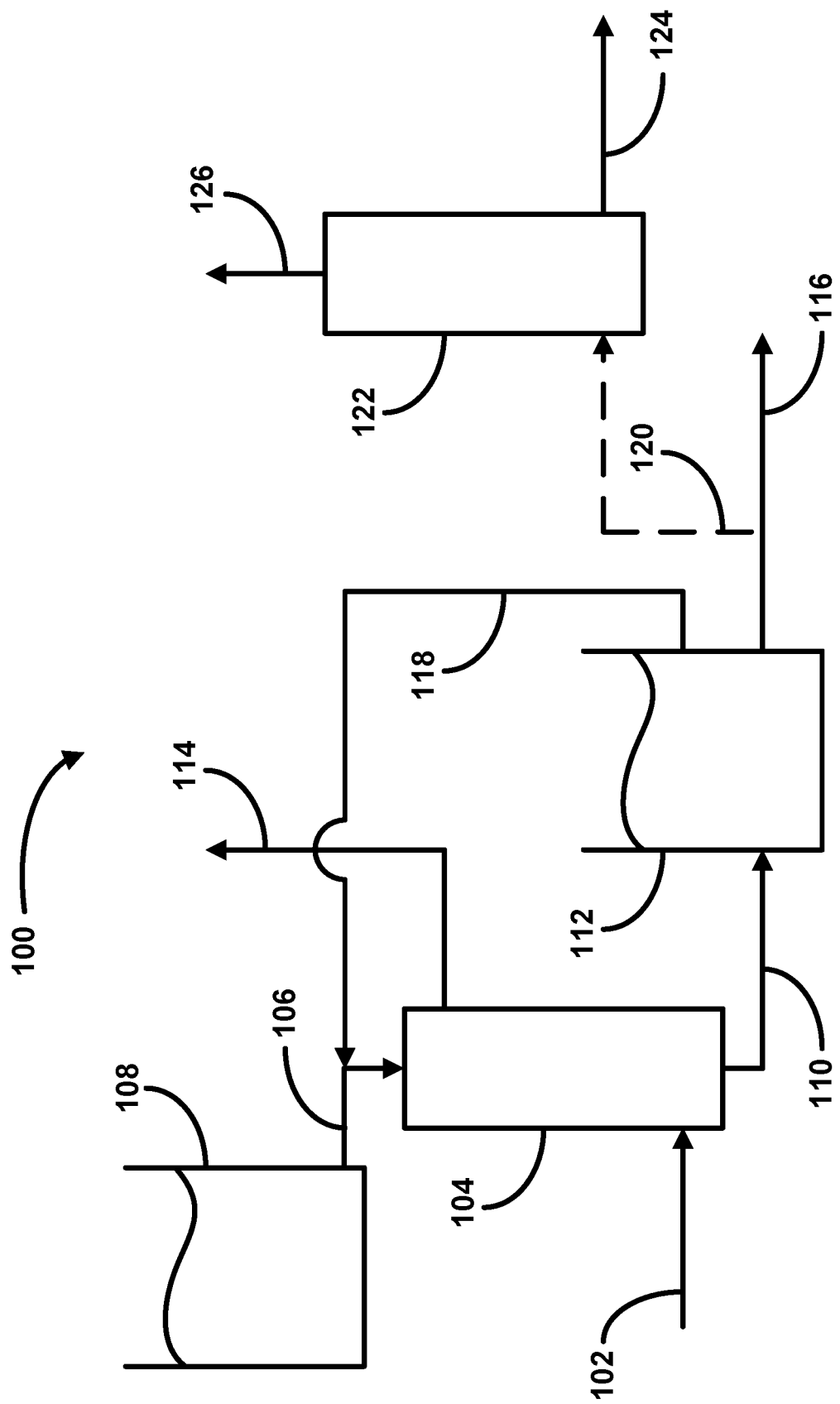
FIG. 1 is a process flow diagram for removing nitrogen-based compounds from a gas stream and producing a nitrogen-based product according to one embodiment of the present invention.

The present invention is more fully described below with reference to the accompanying drawings. While the invention will be described in conjunction with particular embodiments, it should be understood that the invention can be applied to a wide variety of applications, and it is intended to cover alternatives, modifications, and equivalents within the spirit and scope of the invention. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used.

In general, the present invention is directed to a process for removing nitrogen-based or nitrogen-containing compounds from a gas stream by absorbing at least a portion of one of those compounds into a liquid stream. The absorbed nitrogen-based compound in the liquid stream is then reacted with a liquid phase chemical compound to produce a nitrogen-based product. In particular, the nitrogen-based compound in the gas stream and the liquid phase chemical compound with which the absorbed nitrogen-based compound is reacted may be "organic" compounds. It should be appreciated that the term "organic" is used with reference to compounds derived from living organisms, such as from animal matter or plant or vegetable matter, or having animal or plant origins, as opposed synthetic or man-made compounds and as opposed to a classification of chemical compounds containing carbon or otherwise known as classic "organic chemistry." Accordingly, in some embodiments, the nitrogen-based product that is produced through the reaction of the absorbed nitrogen-based compound and the liquid phase chemical compound produces an organic nitrogen-based product. In some embodiments, the nitrogen-based compound in the gas stream is ammonia. In some embodiments, the liquid phase chemical compound with which the absorbed nitrogen-based compound reacts is acetic acid or citric acid or any other acid that may be classified as organic (e.g., lactic acid). It should be appreciated that while these acids traditionally fall within the scope of classic organic chemistry, the reference to organic acid, including organic acetic acid and citric acid, are used to refer to non-synthetically produced forms (i.e., forms that are naturally occurring or derived from living organisms as described above). In some cases, the acetic acid is produced by fermentation and in some cases may be an organic acetic acid. In some cases, the citric acid may be an organic citric acid. Accordingly, in these embodiments, the carbon-13 signature of the nitrogen-based product will be different depending upon whether an organic acid was used compared to a synthetically derived acid. In some embodiments, it should be appreciated that the nitrogen-based product may be a fertilizer, in particular, an organic fertilizer, such as organic ammonium acetate or organic ammonium citrate. Accordingly, in these embodiments, the carbon-13 signature of the fertilizer will be different compared to a fertilizer produced using a synthetically derived acid. In some embodiments, however, it should be appreciated that one or both of the nitrogen-based compounds in the gas stream and the liquid phase chemical compound with which the absorbed nitrogen-based compound is reacted may not be organic.

It should be appreciated that the invention may be used with any gas stream containing a nitrogen-based compound and any liquid phase chemical compound that reacts with the corresponding absorbed nitrogen-based compound to produce a nitrogen-based product. However, the invention has particular application for a gas stream containing an organic nitrogen-based compound and an organic liquid phase chemical compound that reacts with the corresponding absorbed nitrogen-based compound to produce an organic nitrogen-based product, such as an organic fertilizer that may be certified for use in organic agriculture. In some embodiments, the organic nitrogen-based compound in the gas stream is ammonia produced by an animal byproduct process, such as a rendering process or other animal related processing industries; a bio gas produced by any bio gas process, including gases that may be collected from a bio gas pond or a bio reactor. In some embodiments, the liquid phase chemical compound with which the absorbed nitrogen-based compound reacts is organic acetic acid, such as a vinegar produced through fermentation of agricultural raw materials. In this case, the nitrogen-based product is an organic ammonium acetate, such as an ammonium acetate fertilizer product. In some embodiments, the liquid phase chemical compound with which the absorbed nitrogen-based compound reacts is organic citric acid, which may, for example, be extracted from citrus fruits. In this case, the nitrogen-based product is an organic ammonium citrate, such as an ammonium citrate fertilizer product.

It should also be appreciated that in some embodiments, the gas stream is derived from one or more liquid streams containing nitrogen-based compounds, which may also be organic nitrogen-based compounds, that are stripped from the liquid stream into a gas stream that is then processed to product a nitrogen-based product, which may include an organic nitrogen-based product. For example, in some embodiments, the liquid stream containing an organic nitrogen-based compound may include liquid streams produced in various animal related industries, such as liquid streams produced through the treatment of animal processing byproducts and waste, such as liquid streams generated in a rendering process or in bone gelatin production. Such liquid streams may include various centrate or condensate streams, such as blood processing centrate and sludge processing condensate. Such liquid streams may include liquid streams from rendering processes, such as various condensate streams including those produced from condensers used in conjunction with the cooker, an evaporator, a disk dryer, a spray dryer, drum dryer, or any other process step in which a vapor stream is produced and condensed. Condensate sources may also include wet scrubber blow down, spray venturi blow down, hair and feather hydrolyser condensate, cooker and evaporator condensate, blood serum, and other process streams containing ammonia, ammonium, and/or total kjeldahl nitrogen (TKN). The liquid stream may also be a liquid run-off stream from animal holding facilities, such as run-off from a pig farm or various urea streams, or slurries containing organic matter, such as animal manure including chicken manure. It should be appreciated that other organic solid matter or solids containing nitrogen-based or nitrogen-rich compounds can be slurried or hydrolyzed, filtered if necessary, and sent to a stripper to strip the nitrogen compounds to produce a gas stream containing the nitrogen-based compounds. The liquid stream may also be a stream produced from a bio reactor or bio pond.

In addition, the present invention is directed to a process for stripping nitrogen-based compounds from a liquid stream into cavitation bubbles (which may also be referred to as voids) that are intentionally produced or induced in the liquid stream. The cavitation bubbles are produced in the liquid stream by any known means in the art, including the application of the energy to the liquid phase, to cause the production of the cavitation bubbles in the liquid stream. In some embodiments, the cavitation bubbles are induced by using acoustic energy, for example, by applying ultrasonic energy to the liquid stream. In some embodiments, an ultrasonic transducer or set of ultrasonic transducers can be applied to the surface of a flow-through reactor or totally submerged in a flow through reactor through which the liquid stream flows. Alternatively, in other embodiments, a transducer or set of ultrasonic transducers can be applied to the surface of a tank holding the liquid stream. It should be appreciated that the transducers may be integrated into the walls of the flow-through reactor or the tank, and such may also be used in combination with transducers external to the flow-through reactor or tank.

In other embodiments, hydrodynamic cavitation may be used to induce cavitation bubbles in a given liquid by passing the liquid through a constricted channel or by mechanical rotation of an object in the liquid stream. In some embodiments, hydrodynamic cavitation can be used to generate cavitation bubbles in a flow-through reactor through which the liquid stream passes. Alternatively, in other embodiments, hydrodynamic cavitation, for example, mechanically induced hydrodynamic cavitation, can be used to generate cavitation bubbles in a tank holding the liquid stream.

The dissolved nitrogen-based compound in the liquid phase diffuses into the low pressure cavitation bubbles or voids during their growth phase. The gas diffused into the cavitation bubbles or voids prevents the collapse or implosion of the bubble. Gas trapped in the bubble or void becomes pressurized and not all the gas in the cavity diffuses back into the surrounding liquid. As a result, a small bubble is formed containing the nitrogen-based compounds, or nitrogen-rich compounds, that is buoyant and floats to the surface of the liquid. In other words, the nitrogen-based compounds, or nitrogen-rich compounds, are stripped from the liquid phase into the cavitation bubbles.

In embodiments using a flow-through reactor, the liquid stream with the cavitation bubbles is passed to an enclosed tank in which the cavitation bubbles containing the nitrogen-based compounds or nitrogen-rich compounds rise to the top of the tank and are collected in the space above the liquid surface. In the embodiments using a tank or holding tank, the cavitation bubbles can be collected in the void above the liquid surface of the same tank, provided an enclosed tank is used or some other method is used to collect the bubbles are they rise to the surface of the liquid. Alternatively, the liquid can be passed to a second tank that is enclosed and used in the same manner as the tank in the embodiments using a flow-through reactor. The collection of the cavitation bubbles or voids containing the nitrogen-based compounds or nitrogen-rich compounds results in the bubbles or voids collapsing and forming a single gas mass containing the nitrogen-based compounds nitrogen-rich compounds above the surface of the liquid in the tank.

The cavitation bubbles in the form of a single gas mass containing the stripped nitrogen-based compounds are then subjected to absorption during which the nitrogen-based compounds are absorbed into a liquid stream. In some embodiments, the single gas mass is treated in a manner described above for a gas stream containing a nitrogen-based compound that is absorbed and reacted with a liquid phase chemical compound to produce a nitrogen-based product, such as fertilizer. For example, the gas mass including the nitrogen-based or nitrogen-rich compounds, such as ammonia, can be passed through an acidic solution to absorb the nitrogen-based or nitrogen-rich compounds and produce a saleable nitrogen-based product, such as fertilizer. More specifically, in some embodiments, the gas mass containing nitrogen-based or nitrogen-rich compounds, such as ammonia, may be passed through or bubbled through a solution of acetic acid to produce, for example, ammonium acetate, which can be used as a fertilizer. It sound be appreciated that other absorbing solutions could be used to produce, for example, ammonium sulfate or ammonium nitrate, or similar compounds. In some embodiments, the gas mass containing nitrogen-based or nitrogen-rich compounds, such as ammonia, may be passed through or bubbled through a solution of citric acid, which may, for example, be extracted from citrus fruits. In this case, the nitrogen-based product is an organic ammonium citrate, such as an ammonium citrate fertilizer product.

In some embodiments, the liquid stream being treated through the generation of cavitation bubbles contains an organic nitrogen-based compound. For example, in some embodiments, the liquid stream containing an organic nitrogen-based compound may include liquid streams produced in various animal related industries, such as liquid streams produced through the treatment of animal processing byproducts and waste, such as liquid streams generated in a rendering process or in bone gelatin production. Such liquid streams may include various centrate or condensate streams, such as blood processing centrate and sludge processing condensate. Such liquid streams may include liquid streams from rendering processes, such as various condensate streams including those produced from condensers used in conjunction with the cooker, an evaporator, a disk dryer, a spray dryer, drum dryer, or any other process step in which a vapor stream is produced and condensed. Condensate sources may also include wet scrubber blow down, spray venturi blow down, hair and feather hydrolyser condensate, cooker and evaporator condensate, blood serum, and other process streams containing ammonia, ammonium, and/or total kjeldahl nitrogen (TKN). The liquid stream may also be a liquid run-off stream from animal holding facilities, such as run-off from a pig farm or various urea streams, or slurries containing organic matter, such as animal manure including chicken manure. It should be appreciated that other organic solid matter or solids containing nitrogen-based or nitrogen-rich compounds can be slurried or hydrolyzed, filtered if necessary, and sent to a stripper to strip the nitrogen compounds to produce a gas stream containing the nitrogen-based compounds. The liquid stream may also be a stream produced from a bio reactor or bio pond.

In these cases, the cavitation bubbles contain the organic nitrogen-based compound that has been stripped. The cavitation bubbles are then absorbed into an organic liquid phase chemical compound that reacts with the corresponding organic nitrogen-based compound to produce an organic nitrogen-based product, such as an organic fertilizer that may be certified for use in organic agriculture. In some embodiments, the organic nitrogen-based compound in the cavitation bubbles is ammonia produced by an animal related process or animal byproduct process, such as a rendering process. In some embodiments, the liquid phase chemical compound with which the absorbed nitrogen-based compound reacts is organic acetic acid, such as a vinegar produced through fermentation of agricultural raw materials. In this case, the nitrogen-based product is an organic ammonium acetate, such as an ammonium acetate fertilizer product. In some embodiments, the liquid phase chemical compound with which the absorbed nitrogen-based compound reacts is organic citric acid, which may, for example, be extracted from citrus fruits. In this case, the nitrogen-based product is an organic ammonium citrate, such as an ammonium citrate fertilizer product.

In addition, the present invention is directed to a process for stripping nitrogen containing compounds from a liquid stream using a degassing membrane. In this case, a liquid stream containing a nitrogen-based compound is treated, for example, by raising the pH to degas the nitrogen-based compound from the liquid phase. The membrane is designed to permit the degassed nitrogen-based compound to pass through the membrane. The gas that has passed through the membrane contacts an acidic solution on the other side of the membrane to absorb the nitrogen-based or nitrogen-rich compounds and produce a saleable nitrogen-based product, such as fertilizer. In some embodiments, the acidic solution may be an acidic solution of acetic acid to produce, for example, ammonium acetate, which can be used as a fertilizer. It sound be appreciated that other absorbing solutions could be used to produce, for example, ammonium sulfate or ammonium nitrate, or similar compounds. In some embodiments, the acidic solution may be an acidic solution of citric acid to produce, for example, ammonium citrate, which can be used as a fertilizer.

In some embodiments, the liquid stream being treated using the degassing membrane contains an organic nitrogen-based compound. For example, in some embodiments, the liquid stream containing an organic nitrogen-based compound may include liquid streams produced in various animal related industries, such as liquid streams produced through the treatment of animal processing byproducts and waste, such as liquid streams generated in a rendering process or in bone gelatin production. Such liquid streams may include various centrate or condensate streams, such as blood processing centrate and sludge processing condensate. Such liquid streams may include liquid streams from rendering processes, such as various condensate streams including those produced from condensers used in conjunction with the cooker, an evaporator, a disk dryer, a spray dryer, drum dryer, or any other process step in which a vapor stream is produced and condensed. Condensate sources may also include wet scrubber blow down, spray venturi blow down, hair and feather hydrolyser condensate, cooker and evaporator condensate, blood serum, and other process streams containing ammonia, ammonium, and/or total kjeldahl nitrogen (TKN). The liquid stream may also be a liquid run-off stream from animal holding facilities, such as run-off from a pig farm or various urea streams, or slurries containing organic matter, such as animal manure including chicken manure. It should be appreciated that other organic solid matter or solids containing nitrogen-based or nitrogen-rich compounds can be slurried or hydrolyzed, filtered if necessary, and sent to a stripper to strip the nitrogen compounds to produce a gas stream containing the nitrogen-based compounds. The liquid stream may also be a stream produced from a bio reactor or bio pond.

In these cases, the gas that passes through the membrane contains the organic nitrogen-based compound. That gas is then contacted with an organic liquid phase chemical compound that reacts with the corresponding organic nitrogen-based compound to produce an organic nitrogen-based product, such as an organic fertilizer that may be certified for use in organic agriculture. In some embodiments, the organic nitrogen-based compound in the gas that has passed through the membrane is ammonia produced by an animal related process or animal byproduct process, such as a rendering process. In some embodiments, the liquid phase chemical compound with which the absorbed nitrogen-based compound reacts is organic acetic acid, such as a vinegar produced through fermentation of agricultural raw materials. In this case, the nitrogen-based product is an organic ammonium acetate, such as an ammonium acetate fertilizer product. In some embodiments, the liquid phase chemical compound with which the absorbed nitrogen-based compound reacts is organic citric acid, which may, for example, be extracted from citrus fruits. In this case, the nitrogen-based product is an organic ammonium citrate, such as an ammonium citrate fertilizer product.

FIG. 1 is a process flow diagram for removing nitrogen-based compounds from a gas stream and producing a nitrogen-based product according to one embodiment of the present invention. In general, the process 100 includes a gas stream 102 having at least one nitrogen-based compound, such as ammonia, is passed to a gas/liquid contactor 104 in which the gas stream 102 will contact a liquid feed stream or absorbing solution 106 that is fed to the gas/liquid contactor 104 and into which the nitrogen-based compound in the gas stream 102 is absorbed. The liquid feed stream 106 contains a liquid phase chemical compound that reacts with the absorbed nitrogen-based compound from the gas stream 102 to produce, or to further the production of, a desired nitrogen-based product. Following is a more detailed description of the process shown in FIG. 1.

The gas stream 102 may be any gas stream having at least one nitrogen-based compound, such as ammonia. For example, the gas stream 102 may be any industrial or process gas stream containing at least one nitrogen-based compound, such as ammonia. It should be appreciated that the gas stream 102 may be multiple or individual gas streams or a single gas stream that is a collection of gas streams or vapors. In some embodiments, the gas stream 102 is a gas stream containing an organic nitrogen-based compound, such as organic ammonia. Accordingly, in this case, the organic nitrogen-based compound is derived from animal or plant matter. In some embodiments, the organic nitrogen-based compound in the gas stream 102 may be ammonia produced by an animal byproduct process, such as a rendering process. In one embodiment, the gas stream 102 is a gas stream produced from a rendering process, including, for example, one or more or a collection of gases or vapors collected from various process operations within the rendering process. In particular, the gas stream 102 may be one or more or a collection of vapors generated at several points in the rendering process, including the unloading, conveyance, and grinding of raw material; the cooking of the ground material; and other points in the rendering process.

In some embodiments, it should be appreciated that the gas stream 102 may also include one or more gas streams containing nitrogen-based compounds obtained by stripping nitrogen-based compounds from one or more various liquid phase streams. In general, any liquid stream containing nitrogen compounds that could be recovered may be stripped by any method known in the art to produce a gas stream containing the stripped nitrogen-based compounds or their corresponding gaseous form. In this case, the gas stream containing the stripped nitrogen-based compound may constitute the gas stream 102 that is treated as described herein to product a nitrogen-based product, or the gas stream containing the stripped nitrogen-based compound may be combined with other gas streams to provide a single gas stream that constitutes the gas stream 102 that is treated as described herein to product a nitrogen-based product. For example, in some embodiments, the liquid stream containing an organic nitrogen-based compound may include liquid streams produced in various animal related industries, such as liquid streams produced through the treatment of animal processing byproducts and waste, such as liquid streams generated in a rendering process or in bone gelatin production. Such liquid streams may include various centrate or condensate streams, such as blood processing centrate and sludge processing condensate. Such liquid streams may include liquid streams from rendering processes, such as various condensate streams including those produced from condensers used in conjunction with the cooker, an evaporator, a disk dryer, a spray dryer, drum dryer, or any other process step in which a vapor stream is produced and condensed. Condensate sources may also include wet scrubber blow down, spray venturi blow down, hair and feather hydrolyser condensate, cooker and evaporator condensate, blood serum, and other process streams containing ammonia, ammonium, and/or total kjeldahl nitrogen (TKN). The liquid stream may also be a liquid run-off stream from animal holding facilities, such as run-off from a pig farm or various urea streams, or slurries containing organic matter, such as animal manure including chicken manure. It should be appreciated that other organic solid matter or solids containing nitrogen-based or nitrogen-rich compounds can be slurried or hydrolyzed, filtered if necessary, and sent to a stripper to strip the nitrogen compounds to produce a gas stream containing the nitrogen-based compounds. The liquid stream may also be a stream produced from a bio reactor or bio pond.

The liquid feed stream 106 is a solution that will absorb the nitrogen-based compound in the gas stream 102. Accordingly, depending upon the composition and concentration of the nitrogen-based compound in the gas stream 102 and the volumetric flow rate of the gas stream 102 to the gas/liquid contactor 104, the amount of the nitrogen-based compound in the gas stream 102 that is to be absorbed into the liquid stream 106 in the gas/liquid contactor 104, the volumetric flow rate of the liquid feed stream 106 to the gas/liquid contactor 104, and the design of the gas/liquid contactor 104, the composition of the liquid feed stream 106 can be determined. In addition, other parameters of the liquid fee stream 106 may be adjusted depending upon the various operating parameters described above. For example, pH adjustments to the liquid feed stream 106 may be made to optimize absorption of the nitrogen-based compound in the gas stream 102, which can be done by pH control using a feedback or feedforward control system. Also, temperature adjustments may be made to the liquid feed stream 106. The liquid feed stream 106 could be cooled or chilled to increase the absorption of the nitrogen-based compound from the gas stream 102. In some embodiments, the liquid feed stream 106 could be cooled to temperatures less than ambient, such as below 15° C. or below 60° C.

In addition, the liquid feed stream 106 contains the liquid phase chemical compound that is any chemical that will react with the absorbed nitrogen-based compound from the gas stream 102 to produce, or to further the production of, the desired nitrogen-based product. For example, in some embodiments, the liquid phase chemical compound is a liquid phase chemical compound that reacts with the absorbed nitrogen-based compound to produce a nitrogen-based product, such as a fertilizer. In some embodiments, the liquid phase chemical compound is an organic compound (i.e., a compound derived from animal or plant matter).

In this case, it is possible to utilize the process of the present invention to produce an organic nitrogen-based product, such as an organic fertilizer that may be certified as organic and, for example, may be certified for use in organic agriculture. For example, in some embodiments in which that nitrogen-based compound in the gas stream 102 is an organic compound (i.e., a compound derived from animal or plant matter), the use of an organic liquid phase chemical compound may be used to produce an organic nitrogen-based product, such as an organic fertilizer that may be certified as organic and, for example, may be certified for use in organic agriculture. In some embodiments in which the organic nitrogen-based compound in the gas stream 102 is ammonia produced by an animal byproduct process, such as a rendering process, the liquid phase chemical compound that reacts with the absorbed nitrogen-based compound or absorbed ammonia is an organic acid that upon reaction produces an organic nitrogen-based product, such as an organic fertilizer that may be certified as organic and, for example, may be certified for use in organic agriculture.

In some embodiments in which the liquid phase chemical compound is organic, the liquid phase chemical compound is acetic acid, such as a vinegar produced through fermentation of agricultural raw materials. The production of organic acetic acid or vinegar can be done using grains such as corn or other agricultural raw materials such as cane sugar, which are then fermented into alcohol and then into vinegar. Fleischmann's produces two products using this general method of production, Fleischmann's Vinegar White Distilled Vinegar and Fleischmann's Vinegar Organic White Distilled Vinegar, the latter being produced from only certified organic materials. Carbon 13 testing can be used to determine whether the vinegar originates from agricultural materials or fossil fuels and is, therefore, organic, as opposed to synthetically produced acetic acid. In using acetic acid when the nitrogen-based compound in the gas stream 102 is organic ammonia, the nitrogen-based product is an organic ammonium acetate, such as an organic ammonium acetate fertilizer product. In some embodiments, the concentration of acetic acid or vinegar in the solution held in the liquid feed tank 108 may be approximately 30% by weight. In some embodiments, the concentration of acetic acid or vinegar in the solution held in the liquid feed tank 108 may be greater than 30% by weight. It should be appreciated that in using an organic acetic acid, in some embodiments, the carbon-13 signature of the nitrogen-based product or fertilizer will be different compared to a fertilizer produced using synthetically derived acetic acid.

In some embodiments, the organic acid may be citric acid, which may, for example, be extracted from citrus fruits. In this case, the nitrogen-based product is an organic ammonium citrate, such as an ammonium citrate fertilizer product. In some embodiments, other organic acids may be selected to generate other nitrogen-based products.

The liquid feed stream 106 is held in a liquid feed tank 108 that may be any vessel capable of holding the solution of the liquid phase chemical compound for feeding to the gas/liquid contactor 104. In operation, the liquid feed stream 106 containing the liquid phase chemical compound is fed to the gas/liquid contactor 104. Therefore, the liquid feed tank 108 will need to be replenished with fresh solution of the liquid phase chemical compound by any method known in the art to provide an adequate supply of the solution of the liquid phase chemical compound to the gas/liquid contactor 104. Depending upon the concentration of the nitrogen-based compound in the gas stream 102 and the volumetric flow rate of the gas stream 102 to the gas/liquid contactor 104, the amount of the nitrogen-based compound in the gas stream 102 that is absorbed, or desired to be absorbed, into the liquid stream 106 in the gas/liquid contactor 104, and the design of the gas/liquid contactor 104, including the amount of liquid that can be fed to the gas/liquid contactor 104 and the concentration of the liquid phase chemical compound in the liquid feed tank 108, the necessary corresponding volumetric flow rate of the liquid feed stream 106 to the gas/liquid contactor 104 can be determined.

The gas/liquid contactor 104 may be any equipment used to bring a gas stream and a liquid stream into contact. For example, the gas/liquid contactor 104 may be a spray tower, a tray tower, a venturi, a bubbler, and combinations thereof. In operation, the gas/liquid contactor 104 brings the gas stream 102 into contact with the liquid feed stream 106 containing the solution of the liquid phase chemical compound. As a result, the nitrogen-based compound in the gas stream 102 is absorbed into the liquid feed stream 106. The liquid feed stream 106 is then discharged from the gas/liquid contactor 104 as a liquid discharge stream 110. The gas stream 102 is also discharged from the gas/liquid contactor 104 as a gas discharge stream 114, which may be further processed as necessary or discharged to the atmosphere. Further processing of the gas discharge stream 114 may include passing the gas through condensing equipment, such as a reflux condenser, or a process for condensing a gas stream to ensure that any volatiles that were not previously absorbed or that were flashed in the gas/liquid contactor 104 are removed or reduced prior to gas discharge to the atmosphere as desired.

Upon absorption of the nitrogen-based compound in the gas stream 102 into the liquid feed stream 106, the liquid phase chemical compound will react with the absorbed nitrogen-based compound to produce the desired nitrogen-based product. This reaction may occur immediately upon absorption within the gas/liquid contactor and may continue in the liquid phase in the liquid discharge stream 110. The liquid discharge stream 110 is passed to a holding tank 112 that provides two functions. One, the holding tank 112 acts to collect the liquid discharge stream 110 and the nitrogen-based product, and two, the holding tank 112 provides additional residence time, if needed, for the reaction of the liquid phase chemical compound to react with the absorbed nitrogen-based compound to produce additional nitrogen-based product.

A product stream 116, which is a solution containing the nitrogen-based product, is passed from the holding tank 112 for use. For example, a given quantity of the product stream 116 can be passed to any type of vehicle designed to carry liquid, which can then be taken to a storage facility for later sale or directly to an end user for storage or use.

Optionally, a liquid recycle stream 118 may be passed from the holding tank 112 back to the gas/liquid contactor 104. In this case, the liquid recycle stream 118 may be combined with the liquid feed stream 106 prior to entering the gas/liquid contactor 104. One of skill in the art will appreciate whether the liquid recycle stream 118 requires any treatment, such as pH or temperature adjustment, prior to its addition to the liquid feed stream 106. The flow rate of the liquid recycle stream 118 can be adjusted based upon the overall water balance for the process and, accordingly, as determined by the amount of the nitrogen-based product being discharged through the product stream 116.

Since the product stream 116 contains water, it may optionally be concentrated through the removal of a portion of the water. For example, the product stream 116 may optionally be sent to a distillation tower 122 to evaporate a portion of the water in the product stream 116. The product stream 116 after having a portion of the water removed is discharged from the distillation tower 122 as a concentrated product stream 124. This concentrated product stream 124 may be utilized in the same manner as the product stream 116 that is discharged from the holding tank 112 as described above. The evaporated water is discharged from the distillation tower 122 as a gas discharge stream 126 and may be discharged to the atmosphere or further processed if necessary before being discharged to the atmosphere. In some embodiments, the product stream 116 may optionally be processed to remove a significant portion or all of the water to produce a solid nitrogen-based product (not shown). In some embodiments, the product may be further processed to produce a dry nitrogen-based product (not shown).

Figure 2:
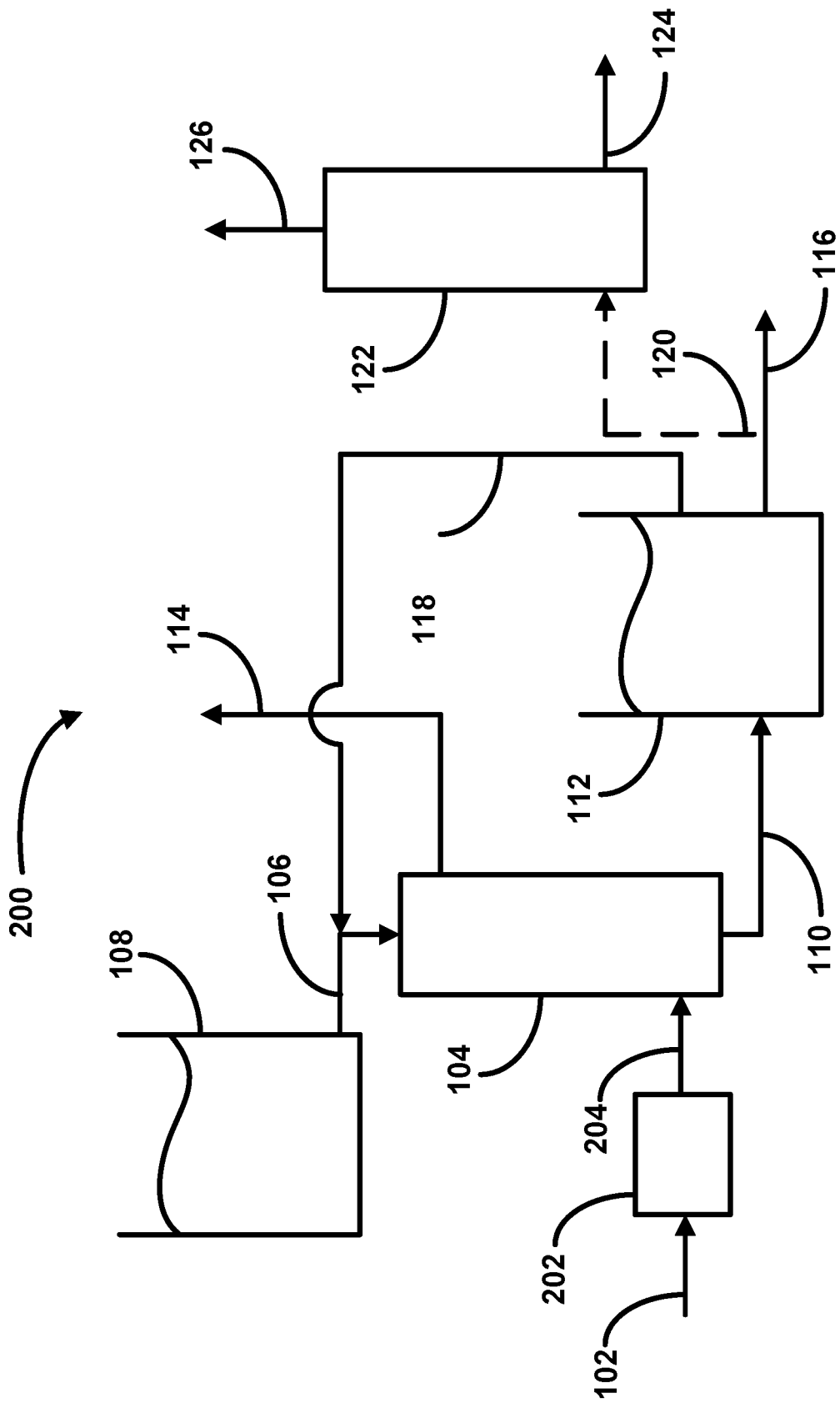
FIG. 2 is a process flow diagram for removing nitrogen-based compounds from a gas stream and producing a nitrogen-based product according to one embodiment of the present invention.

FIG. 2 is a process flow diagram for removing nitrogen-based compounds from a gas stream and producing a nitrogen-based product according to one embodiment of the present invention. The process 200 illustrated in FIG. 2 is the same as that shown in FIG. 1 with the exception that the gas stream 102, which as described above may be one or more gas streams or a collection of one or move gas streams or vapors, is first passed to a condenser 202 that is used to condense and remove certain contaminants and water vapor contained in the gas stream 102 to produce a condensed gas stream 204 that is passed to the gas/liquid contactor 104 for removal of the nitrogen-based compounds in the gas stream 204.

Figure 3:
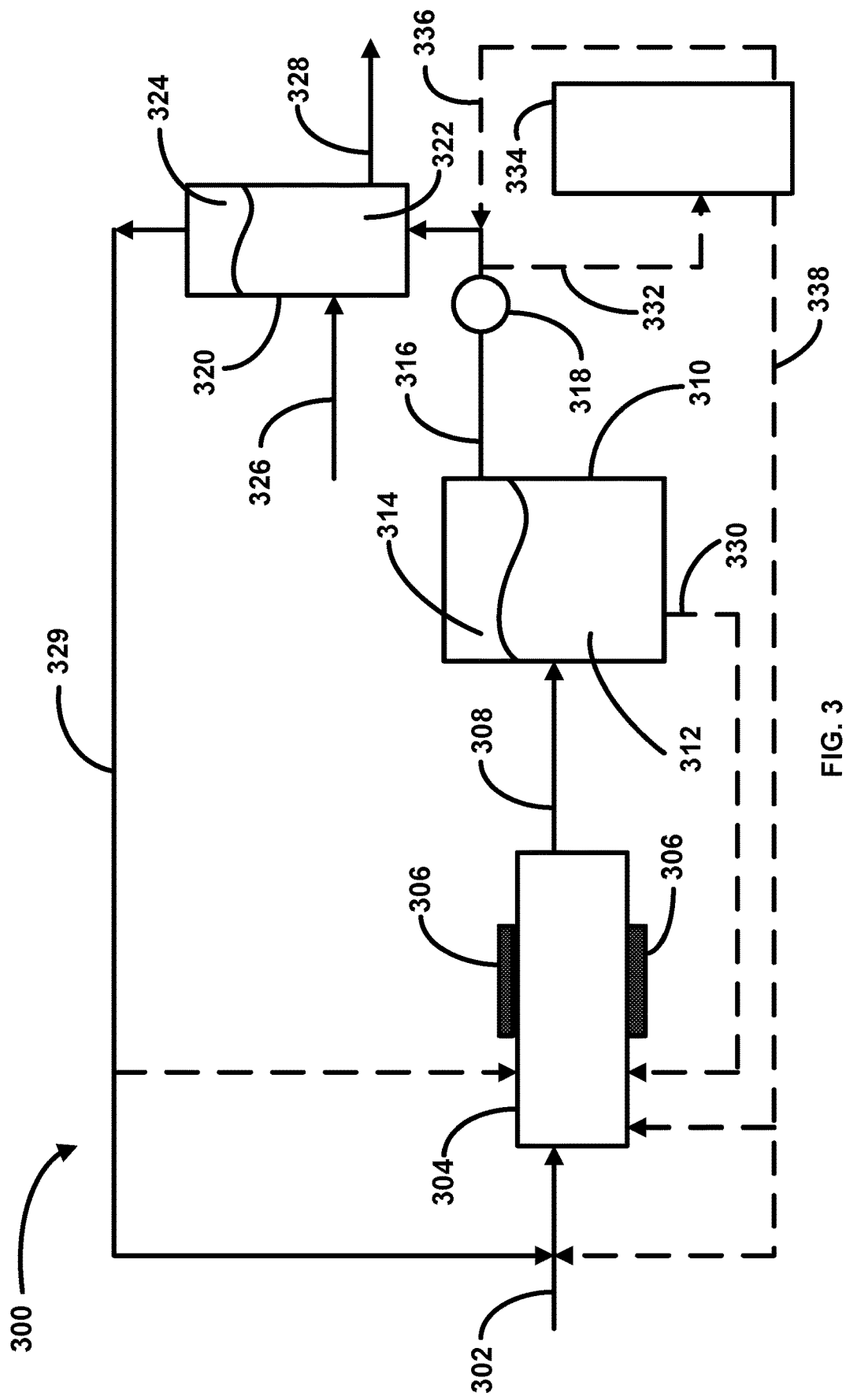
FIG. 3 is a process flow diagram illustrating one embodiment of the present invention using a flow-through reactor and generation of a saleable nitrogen-based product.

FIG. 3 is a process flow diagram illustrating one embodiment of the present invention using a flow-through reactor and generation of a saleable nitrogen-based product. FIG. 3 illustrates a process 300 for stripping a nitrogen-based liquid phase compound from a liquid stream into cavitation bubbles, such that the nitrogen-based compound exists within the cavitation bubbles as a gas, and subsequently absorbing that nitrogen-based compound into a different liquid solution in which it reacts to produce a desired or pre-determined nitrogen-based, liquid phase product, such as a fertilizer.

As shown, a liquid stream 302 containing nitrogen-based compounds is passed to a flow-through reactor 304 in which the liquid stream 302 is subjected to ultrasonic energy provided by transducers 306 adjacent to the flow-through reactor 304. It should be appreciated that the liquid stream 302 may be any liquid stream containing nitrogen-based compounds that ultimately can be stripped from the liquid stream 302. For example, liquid stream 302 may be a condensate stream from a process in which certain nitrogen-based compounds have been condensed from a gas stream, such as an industrial process gas stream or waste stream containing odorous, nitrogen-based compounds. For example, in some embodiments, the liquid stream 302 containing an organic nitrogen-based compound may include liquid streams produced in various animal related industries, such as liquid streams produced through the treatment of animal processing byproducts and waste, such as liquid streams generated in a rendering process or in bone gelatin production. Such liquid streams may include various centrate or condensate streams, such as blood processing centrate and sludge processing condensate. Such liquid streams may include liquid streams from rendering processes, such as various condensate streams including those produced from condensers used in conjunction with the cooker, an evaporator, a disk dryer, a spray dryer, drum dryer, or any other process step in which a vapor stream is produced and condensed. Condensate sources may also include wet scrubber blow down, spray venturi blow down, hair and feather hydrolyser condensate, cooker and evaporator condensate, blood serum, and other process streams containing ammonia, ammonium, and/or total kjeldahl nitrogen (TKN). The liquid stream may also be a liquid run-off stream from animal holding facilities, such as run-off from a pig farm or various urea streams, or slurries containing organic matter, such as animal manure including chicken manure. It should be appreciated that other organic solid matter or solids containing nitrogen-based or nitrogen-rich compounds can be slurried or hydrolyzed, filtered if necessary, and sent to a stripper to strip the nitrogen compounds to produce a gas stream containing the nitrogen-based compounds. The liquid stream may also be a stream produced from a bio reactor or bio pond. These are the types of stream that may be fed to the flow-through reactor 304.

The flow-through reactor 304 may be any structure through which a liquid can flow and to which ultrasonic energy can be applied. The application of ultrasonic energy can be achieved in any manner known in the art, such as through the attachment of ultrasonic transducers 306 that provide an ultrasonic energy wave that passes through the wall of the flow-through reactor 304 into the liquid stream 302.

The application of ultrasonic energy to the liquid stream 302 produces cavitation bubbles or voids in-situ, or in the liquid stream 302 itself, that strip a given liquid phase, nitrogen-based compound from the liquid stream 302 into the cavitation bubbles or voids. In other words, the liquid phase, nitrogen-based compound is stripped into the gas phase and exists within the cavitation bubbles. It should be appreciated that the frequency of the ultrasonic waves can be adjusted to provide the optimal cavitation and cavitation bubble formation. It should be appreciated that multiple, different frequencies could be used that are pulsing or overlapping or varying with time to increase the amount of cavitation bubble formation. It should also be appreciated that the liquid stream 302 can be recycled through the flow-through reactor to subject the liquid phase 302 to multiple applications of ultrasonic energy. In other embodiments, one or more flow-through reactors could be used in series.

It should be appreciated that as mentioned above, that while FIG. 3 illustrates an embodiment in which ultrasonic energy is used to induce the formation of cavitation bubbles, other forms of energy may be used. For example, other types of acoustic energy may be used, hydrodynamic cavitation may be used, or both. Without being bound by theory, the application of ultrasonic energy (or any other energy used to induce cavitation) results in alternating high pressure (compression) and low pressure (rarefaction) cycles. The rates of these cycles depends on the frequency of the ultrasonic energy waves produced, which can be adjusted as needed to produce the appropriate amount of cavitation bubbles or voids. During the low pressure cycle, the ultrasonic waves can create small cavitation bubbles or voids in the liquid. The number of these small cavitation bubbles or voids created by the ultrasonic waves is vast and distributed throughout the liquid. These cavitation bubbles or voids generate a high total bubble surface area exposed to the surrounding liquid solution that serves as an interface through which liquid phase compounds can be stripped. In any case, depending upon the specific type of energy applied to induce cavitation, the amount of cavitation bubble formation and efficiency of stripping and ultimately degassing from the liquid can be adjusted by adjusting the specific energy applied and the manner in which it is applied.

In combination with pH and temperature adjustment or control in the liquid, the dissolved nitrogen-based compound, which in some embodiments can be thought of as a dissolved gas, is driven out of solution and diffuses into the cavitation bubbles or voids during their growth (when the pressure in the bubble is negative). As the dissolved gas fills the bubble or void, it prevents the catastrophic collapse or implosion of the bubble or void. This is because the gas within the bubble now exerts an outward pressure to counter the collapse of the bubble. The acoustic wave also helps to facilitate the touching and coalescence of adjacent bubbles leading to an accelerated growth of bubbles. The bubbles as formed, and containing the nitrogen-based compound that has been essentially stripped from the liquid solution into the bubbles, now rise to the top of the solution and burst, thereby releasing the nitrogen-based gas from the bubbles and into the space above the liquid.

As noted, it should be appreciated that the pH and temperature of the liquid stream 302 may be adjusted to optimize the process in the flow-through reactor 304, including providing a pH and temperature that optimizes the diffusion of a given or targeted nitrogen-based compound from the liquid phase to the cavitation bubbles. For example, in an embodiment in which the nitrogen-based compound in the liquid stream 302 is dissolved ammonia, the pH and temperature of the liquid stream 302 can be adjusted to optimize diffusion of the dissolved ammonia back into the gas phase, such as by adjusting the pH and temperature to basically make the dissolved ammonia insoluble in the solution. It should also be appreciated that pressure may also be adjusted to optimize cavitation bubble formation, for example, through the application of a vacuum as discussed further below.

Figure 4:
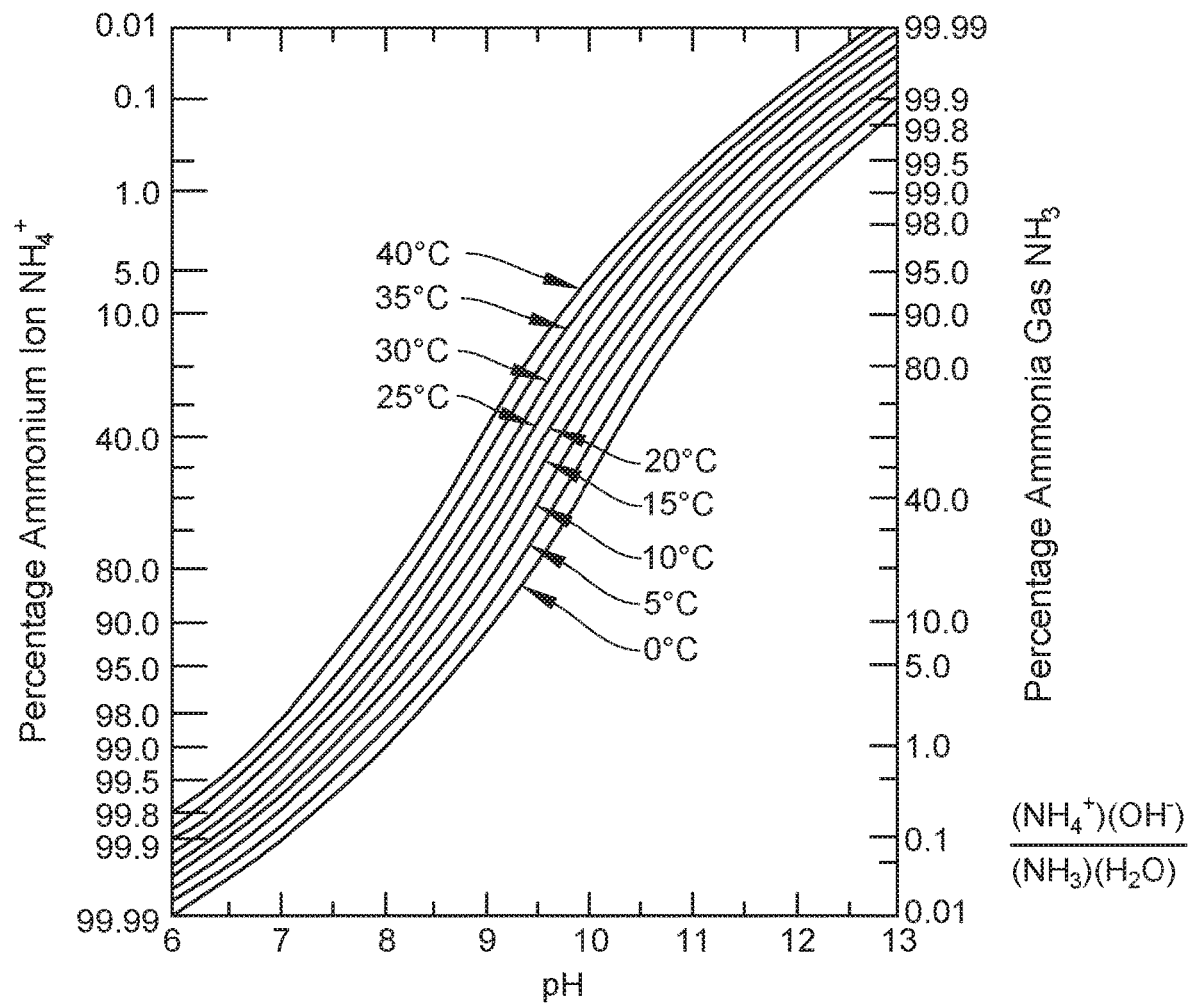
FIG. 4 illustrates the relationship between pH and solubility of ammonium ion/percentage of ammonia gas.

FIG. 4 illustrates the relationship between pH and solubility of ammonium ion/percentage of ammonia gas. Accordingly, in some embodiments, the pH of the liquid stream 302 containing dissolved ammonia gas may be 8.5 or above. In some embodiments, the temperature of the liquid stream 302 containing dissolved ammonia gas, which may be at room temperature, may be raised to be in the range of 100-125° F. or higher, which decreases the solubility of the ammonia. Any method known in the art for adjusting and controlling the pH of the liquid stream 302 prior to entering the flow-through reactor 304 may be used. For example, the pH can be adjusted using any alkaline solution or gas that raises the pH, including, sodium hydroxide, potassium hydroxide, magnesium hydroxide, lime, or carbon dioxide gas.

Returning to FIG. 3, the resulting liquid stream 308 that exits the flow-through reactor 304 includes the liquid stream 302 and the entrained cavitation bubbles containing the stripped nitrogen-based compound. This liquid stream 308 with the entrained cavitation bubbles is passed to an enclosed retention tank 310 in which the liquid is degassed, as the cavitation bubbles rise to the top of the liquid 312 in the tank 310, and the resulting gas is collected in the head space 314 above the surface of the liquid 312 in the retention tank 310. Without being bound by theory, as the cavitation bubbles grow in size, they rise to the surface and then collapse releasing the gas into the head space in the retention tank 310. Accordingly, the gas above the surface of the liquid 312 contains the stripped nitrogen-based compound. The retention tank 310 is sized to provide a liquid residence time in the retention tank 310 that is adequate to allow for the cavitation bubbles to rise to the top of the liquid. It should also be appreciated that the dimensions of the retention tank 310 may be adjusted to provide an optimal liquid depth that allows for the bubbles to rise to the surface. For example, in some embodiments, a shallow depth may be used to facilitate migration of the bubbles to the surface. In some embodiments, the retention tank 310 may be designed with a shallow depth and a larger diameter to provide both a shorter distance for the bubbles to migrate to the surface and a larger overall surface area for the liquid 312 in the retention tank 310. In some embodiments, a vacuum degassing vessel may be used as the retention tank 310.

In some embodiments where foaming occurs in the retention tank 310, or in those embodiments where solutions are prone to foaming, a separate ultrasonic device can be utilized to reduce or eliminate foaming. For example, an ultrasonic transducer can be used to generate ultrasonic waves that collapse the foam bubbles. In some embodiments where foaming occurs in the retention tank 310, or in those embodiments where solutions are prone to foaming, the liquid stream 308 exiting the flow-through reactor 104 can be introduced into the retention tank 310 using a low pressure spray head that sprays the liquid over the surface of the liquid 312 in the retention tank 310 to reduce or eliminate the foam. In some embodiments, the retention tank 310 may utilize weirs to reduce turbulence in the liquid 312 in the retention tank 310 and reduce or eliminate foaming as well.

The gas containing the stripped nitrogen-based compound that is collected in the head space 314 in the enclosed tank 310 is then pulled by a vacuum pump 318 as a gas stream 316. It should be appreciated that the use of a vacuum pump 318, which in some embodiments may be optional as the increase in the gas pressure in the head space of the tank 310 may be sufficient to push the gas out of the tank 310, facilitates the evolution of the nitrogen-based gas from the cavitation bubbles to the head space in the tank 310. The vacuum can accelerate the release of the nitrogen-based gas from the cavitation bubbles and thereby reduce the required size of the tank 310. In another embodiment the vacuum pump 318 may be positioned downstream of a gas/liquid absorber 320 (discussed below) thereby pulling vacuum through both the retention tank 310 and the gas/liquid absorber 320.

It should be appreciated that in some embodiments, introducing small bubbles, oxygen, ambient air, or another gaseous compound into or near the bottom of the retention tank 310 can be done to form a desired compound or to facilitate formation of larger, more stable cavitation bubbles through coalescence. In some embodiments, the composition of the gas that is introduced into the retention tank 310 may be selected to react with the liquid 312 in the retention tank 310 to produce other gaseous compounds that are stripped by the cavitation bubbles or that can be passed to the gas/liquid absorber 320 to react with the liquid absorbing solution 322 (discussed further below) to produce other desired compounds or products. It should also be appreciated that ultrasonic transducers can be used in conjunction with the retention tank 310 to apply additional ultrasonic energy to the liquid therein to further cavitation bubble formation. Accordingly, it should be appreciated that other forms of energy can be added to the retention tank 310 to further induce cavitation and supplement cavitation induced in the flow-through reactor 304. In some embodiments in which a vacuum degassing vessel is used as the retention tank 310, such may reduce or eliminate the need for additional energy being applied to the retention tank 310, such as hydrodynamic cavitation, to supplement cavitation produced in the flow-through reactor 304, compared to operation without a vacuum degassing vessel.

It should be appreciated that electrolysis can be used to generate nano bubbles in the retention tank 310 in embodiments in which the retention tank 310 is operated under a vacuum. These additional bubbles provide additional gas into which the nitrogen-based compound can be stripped. Accordingly, to the extent that additional energy, such as hydrodynamic cavitation, is required to be added to the retention tank 310 to supplement the amount of cavitation bubbles produced in the flow-through reactor 304, such additional energy may be reduced or eliminated. In some embodiments, the nano bubbles produced through electrolysis may be generated in a separate tank (not shown) upstream of the retention tank 310 into which the liquid stream 308 from the flow-through reactor 304 would pass and from which the liquid stream 308 would then pass to the retention tank 310.

The gas stream 316 comprising the gas collected in the head space 314 of the tank 310 is passed to a gas/liquid absorber 320. The gas/liquid absorber 320 may be any device in which a gas containing a given compound is contacted with a liquid into which the given gaseous compound is absorbed. For example, as shown in the FIG. 3, the gas/liquid contactor 320 may be a bubbler containing a liquid absorbing solution 322 through which the gas stream 316 is bubbled. The nitrogen-based compound in the gas stream 316 is then absorbed into the liquid absorbing solution 322 and the resulting gas is collected in the space 324 above the liquid solution 322. The gas collected in the space 324 is then recycled as a gas stream 330 back to the flow-through reactor 304, or alternatively or in combination, may be passed to the retention tank 310 and introduced either into the liquid or gas in the retention tank 310 or discharged from the process. Alternatively, the gas stream comprising the gas collected in the space 324 of the gas/liquid absorber 320 can be combined with the liquid stream 302 being fed initially to the flow-through reactor to allow for any pH or temperature adjustments to be made collectively. It should be appreciated that separate gaseous compounds can be introduced to the gas/liquid absorber 320 to react with the liquid absorbing solution 322 to form other desired compounds or products.

The liquid absorbing solution 322 used in the gas/liquid absorber 320 may be any solution useful in absorbing the nitrogen-based compound from the gas stream 316 that is fed to the gas/liquid absorber 320. In some embodiments, the liquid absorbing solution 322 used in the gas/liquid absorber 320 is an acid to enhance the absorption of the nitrogen-based compound from the gas stream 316 being fed through the gas/liquid absorber 320. In some embodiments, the acid used in absorption may be sulfuric, nitric, acetic, citric, or other acids that are effective in absorbing nitrogen-based compounds. For example, in embodiments in which the nitrogen-based compound is ammonia, any of sulfuric, nitric, acetic, or citric acids may be used. It should be appreciated that the liquid absorbing solution 322 may be any of the liquid solutions 106 discussed above in connection with FIG. 1, including the various liquid solutions containing various organic compounds that react with the absorbed nitrogen-based compound.

It should be appreciated that depending upon the composition of the nitrogen-based compound to be absorbed in the gas/liquid absorber 320, the composition of the liquid absorbing solution 322 can be selected to provide a desired reaction with the nitrogen-based compound that is absorbed to produce a given product. For example, in those embodiments in which the nitrogen-based compound being absorbed in ammonia, if the acid used in the liquid absorbing solution 322 is acetic acid or an organic acetic acid, then ammonium acetate may be produced by reaction. Similarly, in those embodiments in which the nitrogen-based compound being absorbed in ammonia, if the acid used in the liquid absorbing solution 322 is citric acid, then ammonium citrate may be produced by reaction.

The liquid absorption solution 322 in the gas/liquid absorber 320, is replenished by a feed stream 326, which may be an acidic composition. A liquid discharge stream 328 exits the gas/liquid absorber 320 that contains any reaction products produced by reaction between the absorbed nitrogen-based compound and the composition of the liquid absorption solution 322, as well as any unreacted nitrogen-based compound. The feed stream 326 composition and feed rate may be adjusted to provide the desired concentration of acid in the gas/liquid absorber 320, which will depend upon the concentration of the nitrogen-based compound to be absorbed from the gas stream 316 and the discharge rate of the discharge stream 328. In some embodiments, the rate of addition of the feed stream 326 can be based upon pH control of the liquid absorbing solution or based upon density measurements. In some embodiments, the gas/liquid absorber can be operated without discharging the discharge stream 328 until the concentration of ammonia increases to a predefined concentration. At that point, a portion of the solution could be removed for disposal or sale through discharge stream 328. It should be appreciated that in some embodiments, the discharge stream 328 may be further processed by filtration to concentrate the product produced in the gas/liquid absorber 320 (not shown in FIG. 3). In some embodiments, a membrane system may be used to perform this filtration. In some embodiments, a distillation operation may be performed on the discharge stream 328 to concentrate the product. Alternatively, various processes to evaporate water to concentrate the nitrogen-based product may be used.

The discharge stream 328 may also be sent to a holding tank for collection, which may also provide additional residence time, if needed, for the reaction of the liquid phase chemical compound to react with the absorbed nitrogen-based compound to produce additional nitrogen-based product. The discharge stream 328 can be passed to any type of vehicle designed to carry liquid, which can then be taken to a storage facility for later sale or directly to an end user for storage or use.

A gas discharge stream 329 from the gas/liquid absorber is combined with the liquid stream 302 to be treated so that any pH or temperature adjustment can be made to the combined stream prior to entering the flow-through reactor 304. Optionally, the gas discharge stream 329 can be passed directly to the flow-through reactor 304.

FIG. 3 also illustrates several optional processing steps. For example, a portion 330 of the liquid 312 in the retention tank 310 can be recycled through the flow-through reactor 304 to increase efficiency. Also, a portion 332 of the gas stream 316, or all of the gas stream 316, can be passed to a heat exchanger, condenser, or reflux condenser 334 to cool and condense water vapor in the gas stream 316 evolved from the retention tank 310, which can reduce the water vapor carried over into the gas/liquid absorber 320. After passing through the heat exchanger, condenser, or reflux condenser 334, the gas stream 336 would be passed to the gas/liquid absorber 320 or combined with any portion of the gas stream 316 not sent to the exchanger, condenser, or reflux condenser 334 and passed to the gas/liquid absorber 320. Condensate stream 338 from the heat exchanger, condenser, or reflux condenser 134 can be combined with the liquid stream 302 to be treated to allow for any pH or temperature adjustments to be made prior to feeding the liquid stream 302 to the flow-through reactor 304. Alternatively, the condensate stream 338 can be passed directly to the flow-through reactor 304. In some embodiments, the condensate stream 338 can simply be discharged from the system (not shown). It should be appreciated that in some embodiments, a pressure relief valve or other restriction device can be placed downstream of the flow-through reactor 304 to provide back pressure, which may provide better degassing results in the retention tank 310.

Figure 5:
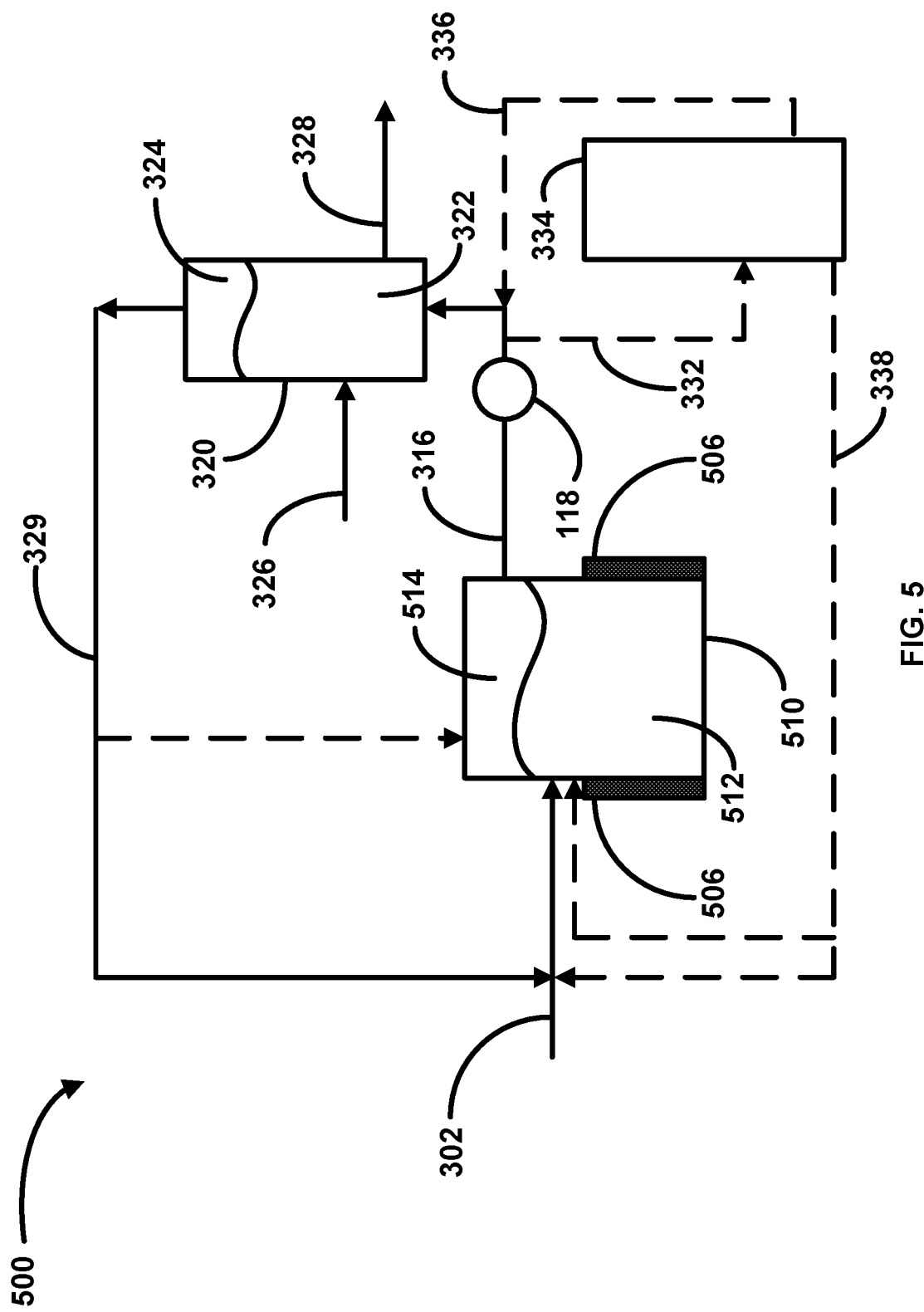
FIG. 5 is a process flow diagram illustrating one embodiment of the present invention using a tank reactor and generation of a saleable nitrogen-based product.

FIG. 5 is a process flow diagram illustrating one embodiment of the present invention using a tank reactor and generation of a saleable nitrogen-based product. FIG. 5 is similar to FIG. 3 with the exception that the liquid stream 302 to be treated is sent directly to a retention tank 510 in which the application of ultrasonic energy to the liquid is applied. In this embodiment, the retention tank 510 is outfitted with a source of ultrasonic energy, such as transducers 506 that may be placed on the walls of the retention tank 510 to apply the ultrasonic energy waves directly to the retention tank 510 and the liquid 512 held therein. In other words, the flow-through reactor 304 in FIG. 3 can be eliminated from the process.

It should be appreciated that all other aspects of the process shown in FIG. 5 are the same as those shown in FIG. 3 and have been described above in connection with FIG. 3. However, with respect to the gas discharge stream 329 from the gas/liquid absorber 320, that stream 329 can optionally be passed directly to the retention tank 510, as opposed to the flow-through reactor as shown in FIG. 3. Similarly, the condensate stream 338 can also be passed directly to the retention tank 510, as opposed to the flow-through reactor as shown in FIG. 3. It should be appreciated that the variations described above in connection with FIG. 3 apply equally to the process shown in FIG. 5.

Figure 6:
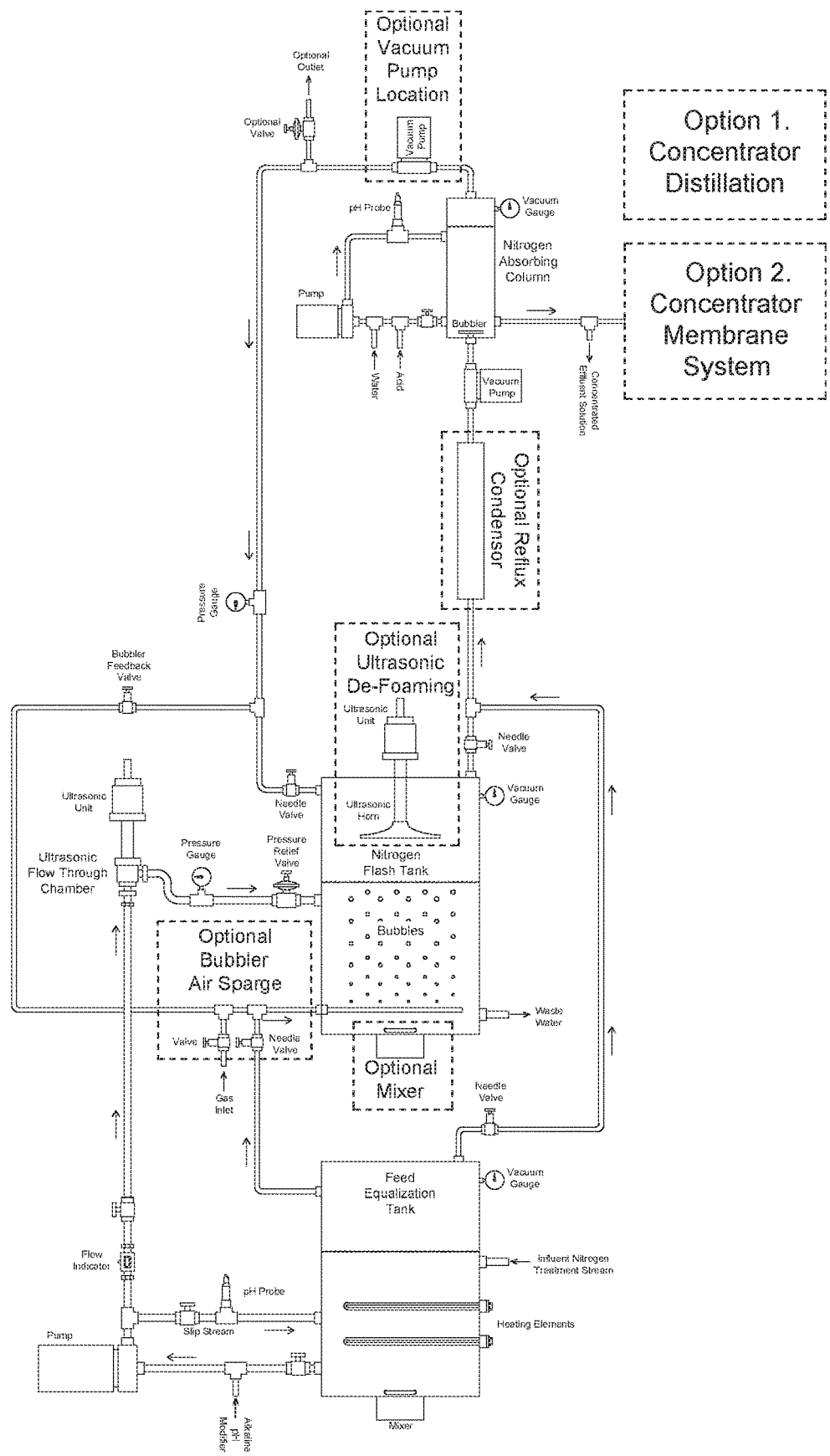
FIG. 6 is a process flow diagram illustrating one embodiment of the present invention using a flow-through reactor and recycle to produce a saleable nitrogen-based product.

FIG. 6 is a process flow diagram illustrating one embodiment of the present invention using a flow-through reactor and recycle to produce a saleable nitrogen-based product. FIG. 6 is similar to FIG. 3 in that a flow-through reactor is used; however, in this embodiment, the liquid stream to be subjected to ultrasonic energy is added to a recycle stream that passes from a retention tank, through a chamber (i.e., the flow-through reactor) to which ultrasonic energy is applied by an ultrasonic unit, and back to the retention tank. The retention tank is similar to the retention tank 310 in FIG. 3 in that the retention tank is an enclosed tank in which the cavitation bubbles or voids rise to the top of the tank and can be collected in the head space above the liquid surface.

The process as shown in FIG. 6 also illustrates several specific features. For example, a slip stream is shown in connection with the recycle stream that passes through the ultrasonic chamber in which a pH probe is used to allow for feedback control of the pH and addition of caustic, lime, alkaline magnesium compounds, or other compounds to modify the pH of this recycle stream. Further, heating elements in the retention tank allow for temperature control of the liquid. A similarly slip stream is shown in connection with the gas/liquid absorber or bubbler to also provide for pH control of the liquid absorbing solution through the addition of a given acid. Further, an optional membrane system and optional distillation system are shown that can be used to treat the liquid discharge and product from the gas/liquid absorber or bubbler to concentrate the desired product.

Figure 7:
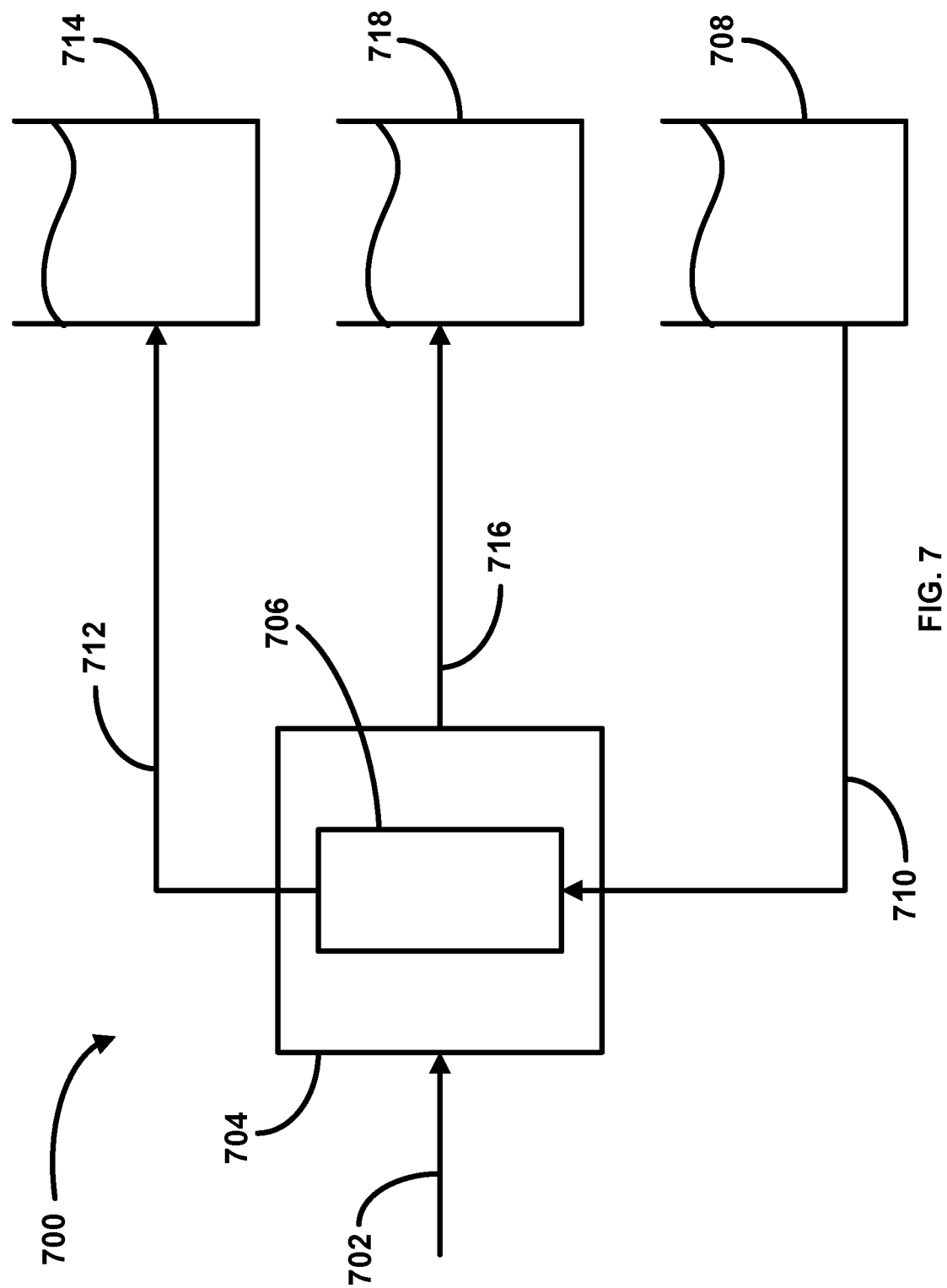
FIG. 7 is a process flow diagram illustrating one embodiment of the present invention using a degassing membrane.

FIG. 7 is a process flow diagram illustrating one embodiment of the present invention using a degassing membrane. The process 700 shown in FIG. 1 is used to treat a liquid stream a nitrogen-based compound by raising the pH of the liquid stream to degas the nitrogen-based compound and subject the liquid stream to a degassing membrane that permits the degassed nitrogen-based compound to pass through the membrane into an acidic solution containing a liquid phase chemical compound that reacts with the nitrogen-based compound to produce a desired nitrogen-based product, such as a fertilizer.

As shown, a liquid stream 702 containing a nitrogen-based compound is passed to a holding tank 704 that contains a degassing membrane 706 and which facilitates contact between the liquid stream 702 and one side of the degassing membrane 706 or the continuous passing of the liquid stream 702 over one side of the degassing membrane 706. It should be appreciated that the liquid stream 702 may be any liquid stream containing nitrogen-based compounds that ultimately can be stripped from the liquid stream 702. For example, liquid stream 702 may be a condensate stream from a process in which certain nitrogen-based compounds have been condensed from a gas stream, such as an industrial process gas stream or waste stream containing odorous, nitrogen-based compounds. For example, in some embodiments, the liquid stream 702 containing an organic nitrogen-based compound may include liquid streams produced in various animal related industries, such as liquid streams produced through the treatment of animal processing byproducts and waste, such as liquid streams generated in a rendering process or in bone gelatin production. Such liquid streams may include various centrate or condensate streams, such as blood processing centrate and sludge processing condensate. Such liquid streams may include liquid streams from rendering processes, such as various condensate streams including those produced from condensers used in conjunction with the cooker, an evaporator, a disk dryer, a spray dryer, drum dryer, or any other process step in which a vapor stream is produced and condensed. Condensate sources may also include wet scrubber blow down, spray venturi blow down, hair and feather hydrolyser condensate, cooker and evaporator condensate, blood serum, and other process streams containing ammonia, ammonium, and/or total kjeldahl nitrogen (TKN). The liquid stream may also be a liquid run-off stream from animal holding facilities, such as run-off from a pig farm or various urea streams, or slurries containing organic matter, such as animal manure including chicken manure. It should be appreciated that other organic solid matter or solids containing nitrogen-based or nitrogen-rich compounds can be slurried or hydrolyzed, filtered if necessary, and sent to a stripper to strip the nitrogen compounds to produce a gas stream containing the nitrogen-based compounds. The liquid stream may also be a stream produced from a bio reactor or bio pond.

Prior to contacting the liquid stream 702 with one side of the degassing membrane 706, the pH of the liquid stream 702 is increased to a level necessary to degas the nitrogen-based compound. In some embodiments in which the nitrogen-based compound is ammonium or dissolved ammonia, the pH may be raised to pH 9 or above. It should be appreciated that the pH of the liquid stream 702 may be raised prior to passing the liquid stream 702 to the holding tank 704 or the pH may be raised in the holding tank 704.

Any base, such as sodium hydroxide, may be used to raise the pH to the necessary level. However, it should be appreciated that the use of calcium hydroxide ($Ca(OH)_2$), lime, or magnesium hydroxide ($Mg(OH)_2$), may result in solids formation in the liquid phase. Accordingly, in this case filtering the liquid stream 702 prior to entering the holding tank 704 and prior to contacting the degassing membrane 706 may be necessary to avoid plugging the degassing membrane 706 with solids. Similarly, if the liquid stream 702 contains fats, oils, or greases, saponification of these compound to form glycerin may be desirable. In this case as well, the liquid stream 702 prior to entering the holding tank 704 or contacting the degassing membrane 706 may be filtered to remove solids that may otherwise plug the degassing membrane 706.

It should be appreciated that depending upon the composition of the liquid stream 702, the order in which the pH of the liquid stream 702 is increased and when the liquid stream 702 is filtered may be altered. In other words, in some embodiments, the pH of the liquid stream 702 may be increased followed by filtering or vice versa. For example, if lime is used as the base to increase the pH, such may be done first, since the addition of the lime may result in formation of certain calcium solids, followed by filtering. Alternatively, in some cases, it may be desirable to remove solids in the liquid stream 702 before increasing the pH.

After contacting one side of the degassing membrane 706, the liquid stream 702 exits the holding tank 704 as a discharge stream 716 that may be collected in a holding tank 118 for disposal. Depending upon the composition of this discharge stream 716, it may be recycled back to the holding tank 704 (not shown).

The other side of the degassing membrane 706 is subjected to a liquid absorbing solution 710 that is fed from a liquid absorbing solution holding tank 708. The liquid absorbing solutions 710 may be any solution useful in absorbing the degassed nitrogen-based compound that has passed through the degassing membrane 706 from the liquid stream 702. In some embodiments, the liquid absorbing solution 710 contains a liquid phase chemical to react with the nitrogen-based compound that has passed through the degassing membrane 706, such as an acid to enhance the absorption/dissolution of the nitrogen-based compound from the liquid stream 702. In some embodiments, the acid used in absorption may be sulfuric, nitric, acetic, citric, or other acids that are effective in absorbing nitrogen-based compounds. For example, in embodiments in which the nitrogen-based compound is ammonia, any of sulfuric, nitric, acetic, or citric acids may be used. It should be appreciated that the liquid absorbing solution 710 may be any of the liquid solutions 106 discussed above in connection with FIG. 1, including the various liquid solutions containing various organic compounds that react with the absorbed nitrogen-based compound.

It should be appreciated that depending upon the composition of the nitrogen-based compound to be absorbed into the liquid absorbing solution 710, the composition of the liquid absorbing solution 710 can be selected to provide a desired reaction with the nitrogen-based compound that is absorbed to produce a given product. For example, in those embodiments in which the nitrogen-based compound being absorbed is ammonia, if the acid used in the liquid absorbing solution 710 is acetic acid or an organic acetic acid, then ammonium acetate may be produced by reaction. Similarly, in those embodiments in which the nitrogen-based compound being absorbed in ammonia, if the acid used in the liquid absorbing solution 710 is citric acid, then ammonium citrate may be produced by reaction.

At this point, the liquid absorbing solution 710 has the other side of the degassing membrane 706 and absorbed the degassed nitrogen-based compound that has passed through the degassing membrane 706 and the liquid phase chemical in the liquid absorbing solution 710 has reacted with the absorbing the degassed nitrogen-based compound to produce the desired nitrogen-based product contained in the product stream 712 exiting the degassing membrane 706. The product stream 712 is passed to a holding tank 714. At that point, the product stream 712 may be used or sold or optionally may be further processed by filtration to concentrate the product produced (not shown). In some embodiments, a membrane system may be used to perform this filtration. In some embodiments, a distillation operation may be performed to concentrate the product. Alternatively, various processes to evaporate water may be used as well to concentrate the nitrogen-based product.

The holding tank 714 for the product stream 712 may also provide additional residence time, if needed, for the reaction of the liquid phase chemical compound to react with the absorbed nitrogen-based compound to produce additional nitrogen-based product. The product stream 712 can be passed to any type of vehicle designed to carry liquid, which can then be taken to a storage facility for later sale or directly to an end user for storage or use.

Various embodiments of the invention have been described above. However, it should be appreciated that alternative embodiments are possible and that the invention is not limited to the specific embodiments described above. For example, although reference is made to gas streams containing nitrogen-based compounds from animal byproduct processing, such as rendering, the processes described above can be used in connection with any gas or liquid stream containing nitrogen compounds that can be absorbed to generate a nitrogen-based product, and in particular, an organic nitrogen-based products, such as a fertilizer that can be certified as organic for use, for example in organic agriculture.

What is claimed is:

1. A method for removing a compound from a gas stream to produce a fertilizer, comprising:
   absorbing a non-synthetic gas phase nitrogen-based compound in a gas stream into a liquid stream thereby producing an absorbed non-synthetic nitrogen-based compound in the liquid stream, wherein the gas stream comprises a waste gas stream generated in an animal byproduct process and the liquid stream comprises a non-synthetic acid; and
   reacting the absorbed non-synthetic nitrogen-based compound with the non-synthetic acid to produce a non-synthetic, liquid phase nitrogen-based fertilizer acceptable for use in organic agriculture.

2. The method of claim 1, wherein the non-synthetic gas phase nitrogen-based compound in the gas stream comprises non-synthetic ammonia.

3. The method of claim 1, wherein the non-synthetic acid is non-synthetic acetic acid.

4. The method of claim 1, wherein the non-synthetic acid is non-synthetic citric acid.

5. The method of claim 1, wherein the non-synthetic gas phase nitrogen-based compound in the gas stream comprises non-synthetic ammonia and the non-synthetic acid is non-synthetic acetic acid.

6. The method of claim 5, wherein the non-synthetic liquid phase nitrogen-based fertilizer comprises a non-synthetic ammonium acetate fertilizer.

7. The method of claim 1, wherein the non-synthetic gas phase nitrogen-based compound in the gas stream comprises non-synthetic ammonia and the non-synthetic acid is non-synthetic citric acid.

8. The method of claim 7, wherein the non-synthetic nitrogen-based fertilizer comprises a non-synthetic ammonium citrate fertilizer.

9. The method of claim 1, wherein the animal byproduct process comprises a rendering process.

10. The method of claim 1, wherein the gas stream comprises a first gas stream and further comprising:
    stripping a non-synthetic liquid phase nitrogen-based compound from a liquid stream in the animal byproduct process to produce a second gas stream comprising the non-synthetic gas phase nitrogen-based compound; and
    adding the second gas stream to the first gas stream.

11. The method of claim 10, wherein the non-synthetic liquid phase nitrogen-based compound comprises non-synthetic ammonium, the non-synthetic acid is non-synthetic acetic acid, and the non-synthetic nitrogen-based fertilizer comprises ammonium acetate fertilizer.

12. The method of claim 10, wherein the non-synthetic liquid phase nitrogen-based compound comprises non-synthetic ammonium, the non-synthetic acid is non-synthetic citric acid, and the non-synthetic nitrogen-based fertilizer comprises an ammonium citrate fertilizer.

13. The method of claim 10, wherein the liquid stream comprises a combination of a plurality of liquid streams in the animal byproduct process.

14. A method for removing a compound from a gas stream to produce a fertilizer, comprising:
    producing a liquid run-off stream from manure comprising a non-synthetic nitrogen-based compound;
    stripping the non-synthetic nitrogen-based compound in the liquid run-off stream into a gas stream to produce a non-synthetic gas phase nitrogen-based compound;
    absorbing the non-synthetic gas phase nitrogen-based compound in the gas stream into a second liquid stream comprising a non-synthetic acid continuously passing through a gas/liquid contactor concurrently with the gas stream, thereby producing an absorbed nitrogen-based compound; and
    reacting the absorbed nitrogen-based compound with the non-synthetic acid to produce a non-synthetic nitrogen-based fertilizer acceptable for use in organic agriculture.

15. The method of claim 14, wherein the non-synthetic gas phase nitrogen-based compound comprises non-synthetic ammonia, the non-synthetic acid comprises non-synthetic acetic acid, and the non-synthetic nitrogen-based fertilizer comprises ammonium acetate fertilizer.

16. The method of claim 14, wherein the non-synthetic gas phase nitrogen-based compound comprises non-synthetic ammonia, the non-synthetic acid comprises non-synthetic citric acid, and the non-synthetic nitrogen-based fertilizer comprises ammonium citrate fertilizer.

17. A method for removing a compound from a gas stream to produce a product comprising:
    absorbing a non-synthetic gas phase nitrogen-based compound in a gas stream into a liquid stream comprising a non-synthetic acid, wherein the liquid stream continuously passes through a gas/liquid contactor concurrently with the gas stream, thereby producing an absorbed nitrogen-based compound, wherein the gas stream comprises a gas stream generated directly from an animal byproduct comprising waste animal tissue; and
    reacting the absorbed nitrogen-based compound with the non-synthetic acid to produce a non-synthetic nitrogen-based product that is a fertilizer suitable for use in organic agriculture and comprising a liquid phase solution of dissociated nitrogen-based cations and corresponding acid anions.

18. The method of claim 17, wherein the non-synthetic gas phase nitrogen-based compound comprises non-synthetic ammonia, the non-synthetic acid comprises non-synthetic acetic acid, and the non-synthetic nitrogen-based product comprises ammonium acetate fertilizer.

19. The method of claim 17, wherein the non-synthetic gas phase nitrogen-based compound comprises non-synthetic ammonia, the non-synthetic acid comprises non-synthetic citric acid, and the non-synthetic nitrogen-based product comprises ammonium citrate fertilizer.

20. A method for removing a compound from a gas stream to produce a fertilizer, comprising:
- combining a plurality of waste gas streams each comprising non-synthetic ammonia into a single gas stream, wherein each of the waste gas streams is generated by a different process step within a rendering process;
- absorbing the ammonia in the single gas stream into a liquid stream comprising a non-synthetic acid concurrently passing through a gas/liquid contactor with the single gas stream, thereby producing absorbed ammonia; and
- reacting the absorbed ammonia with the non-synthetic acid to produce a liquid phase, non-synthetic fertilizer product suitable for use in organic agriculture.

21. The method of claim 1, wherein the animal byproduct process comprises a rendering process and wherein the gas stream comprises one or more gas streams each produced by a separate process operation within the rendering process.

22. A method for removing a compound from a gas stream to produce a fertilizer, comprising:
- absorbing a non-synthetic gas phase nitrogen-based compound in a gas stream into a liquid stream thereby producing an absorbed non-synthetic nitrogen-based compound in the liquid stream, wherein the gas stream comprises a waste gas stream generated in an animal byproduct process and the liquid stream comprises a non-synthetic acid;
- reacting the absorbed non-synthetic nitrogen-based compound with the non-synthetic acid to produce a non-synthetic, liquid phase nitrogen-based fertilizer; and
- applying the non-synthetic, liquid phase nitrogen-based fertilizer in an organic farming application.

23. A method for removing a compound from a gas stream to produce a fertilizer, comprising:
- producing a slurried manure;
- combining the slurried manure with a liquid run-off stream comprising a non-synthetic nitrogen-based compound to produce a single liquid stream comprising the non-synthetic nitrogen-based compound;
- stripping the non-synthetic nitrogen-based compound in the single liquid stream into a gas stream to produce a non-synthetic gas phase nitrogen-based compound;
- absorbing the non-synthetic gas phase nitrogen-based compound in the gas stream into a second liquid stream comprising a non-synthetic acid continuously passing through a gas/liquid contactor concurrently with the gas stream, thereby producing an absorbed nitrogen-based compound; and
- reacting the absorbed nitrogen-based compound with the non-synthetic acid to produce a non-synthetic nitrogen-based fertilizer acceptable for use in organic agriculture.

* * * * *